United States Patent
Lueck et al.

(10) Patent No.: US 6,641,638 B1
(45) Date of Patent: *Nov. 4, 2003

(54) PROCESS FOR NITROGEN OXIDE WASTE CONVERSION TO FERTILIZER

(75) Inventors: Dale E. Lueck, Merritt Island, FL (US); Clyde F. Parrish, Melbourne, FL (US)

(73) Assignee: The United States of America as represented by the Administrator of the National Aeronautics & Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/511,634

(22) Filed: Feb. 17, 2000

Related U.S. Application Data

(63) Continuation-in-part of application No. 08/772,057, filed on Dec. 3, 1996, now Pat. No. 6,039,783.

(51) Int. Cl.[7] ............................. C01B 21/48; C05C 5/02
(52) U.S. Cl. ......................... 71/59; 423/235; 423/393; 423/394; 423/395
(58) Field of Search .................. 71/59; 423/235, 423/393, 394, 395

(56) References Cited

U.S. PATENT DOCUMENTS

| | | |
|---|---|---|
| 3,991,167 A | 11/1976 | Depommier et al. ........ 423/393 |
| 4,119,538 A | 10/1978 | Yamauchi |
| 4,341,747 A | 7/1982 | Downey ................... 423/393 |
| 4,514,366 A | 4/1985 | Barber |
| 5,192,355 A | 3/1993 | Eastin ..................... 423/395 |
| 5,275,639 A | 1/1994 | Sullivan |
| 5,345,033 A | 9/1994 | McLaughlin |
| 5,362,319 A | 11/1994 | Johnson |
| 5,447,637 A | 9/1995 | Barber |
| 5,514,352 A | 5/1996 | Hanna et al. |
| 5,637,282 A | 6/1997 | Osborne et al. ............. 423/235 |
| 6,039,783 A | * 3/2000 | Lueck et al. ............... 423/235 |
| 6,146,604 A | * 11/2000 | Kiiskila et al. ............. 423/235 |

* cited by examiner

Primary Examiner—Wayne A. Langel
(74) Attorney, Agent, or Firm—Randall M. Heald; Gary G. Borda; John G. Mannix

(57) ABSTRACT

The present invention describes a process for converting vapor streams from sources containing at least one nitrogen-containing oxidizing agent therein to a liquid fertilizer composition comprising the steps of:

a) directing a vapor stream containing at least one nitrogen-containing oxidizing agent to a first contact zone, b) contacting said vapor stream with water to form nitrogen oxide(s) from said at least one nitrogen-containing oxidizing agent, c) directing said acid(s) as a second stream to a second contact zone, d) exposing said second stream to hydrogen peroxide which is present within said second contact zone in a relative amount of at least 0.1% by weight of said second stream within said second contact zone to convert at least some of any nitrogen oxide species or ions other than in the nitrate form present within said second stream to nitrate ion, e) sampling said stream within said second contact zone to determine the relative amount of hydrogen peroxide within said second contact zone, f) adding hydrogen peroxide to said second contact zone when a level of hydrogen peroxide less than 0.1% by weight in said second stream is determined by said sampling, g) adding a solution comprising potassium hydroxide to said second stream to maintain a pH between 6.0 and 11.0 within said second stream within said second contact zone to form a solution of potassium nitrate, and h) removing said solution of potassium nitrate from said second contact zone.

9 Claims, 8 Drawing Sheets

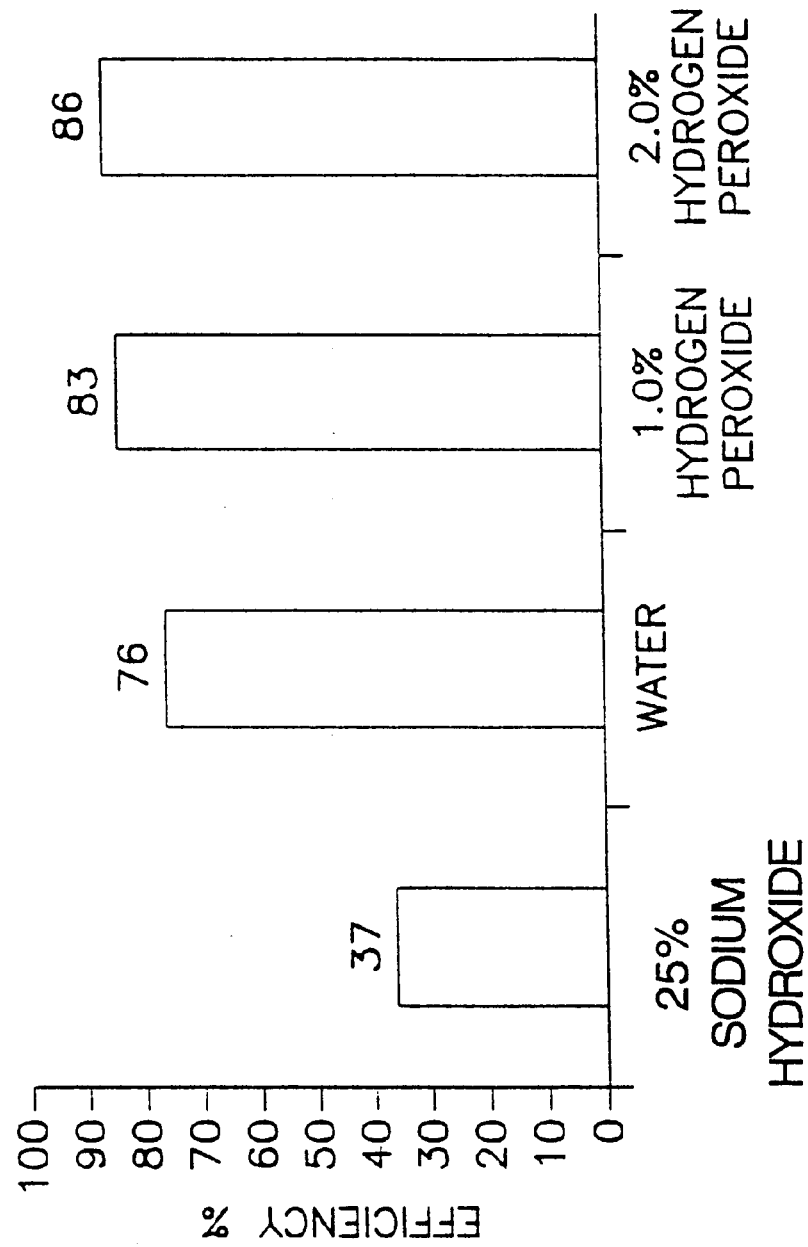

PROCESS FOR NITROGEN OXIDE WASTE CONVERSION TO FERTILIZER

This application is a Continuation-In-Part application of U.S. Ser. No. 08/772,057, filed Dec. 3, 1996, U.S. Pat. No. 6,039,783.

FIELD OF THE INVENTION

The present invention relates to a method and apparatus for the cleansing of environments containing compounds which contain nitrogen and oxygen (including nitrogen oxide waste environments) and the conversion of nitrogen oxides to fertilizer.

BACKGROUND OF THE INVENTION

Many types of processes and industrial environments generate compounds containing nitrogen and oxygen, including nitrogen oxides, as effluents or waste materials. Any process which provides a sufficiently hot metal surface in contact with air can cause the formation of nitrogen oxides (usually as NO, $NO_2$, or $N_2O_2$), with the heated metal surface acting as a catalyst. Metal finishing processes, certain etching processes, and chemical syntheses can produce nitrogen oxides as a by-product. Compounds containing nitrogen and oxygen (such as hydrazines) are also used in commerce or are produced as by-products in certain processes.

Although nitrogen oxide emissions have not received as widespread attention as sulfur oxide emissions, the nitrogen oxides similarly form acids when combined with water. Nitrous acid and nitric acid are relatively strong acids with high pKa values which may be harmful to the environment and hazardous to the health of persons or animals which come into contact with the oxide or the acid.

Hydrogen peroxide ($H_2O_2$), with and without acids or bases, has been used to remove NOx and other acid gases from combustion flue gases, metal pickling operations, fluidized bed gas scrubbers, spray dryers, and nuclear fuel processing operations. That process with acids converts the nitrogen oxides to nitric acid, assuring that there is little nitrous acid remaining in the stream ("The Use of Hydrogen Peroxide for the Control of Air Pollution," *Stud. Environ. Sci.*, 34, 275–292, (1988), CA110(18); 159688s; "Gas Scrubber Using and Alkali Solution Containing Hydrogen Peroxide," Japanese patent JP 48101378, CA80(26):148789m; "Absorbing Nitrogen Oxides from a Waste Gas with a Solution Containing Hydrogen Peroxide, Hydroxide and Cupric or Ferrous Ions," Japan Patent JP 49008465, CA80(26):148804n; "Nitrogen Oxide Removal from Gases by Scrubbing." Japan Patent JP 52085979, CA88(10):65480t; and "Conversion of Nitrogen Oxides to Potassium Nitrate in Waste Gas Treatment," Japan Patent JP 50033981, CA88(10):65480t.). However, combustion flue gas scrubbing has been the primary use of hydrogen peroxide in scrubbers, and these streams usually contain numerous effluents, including sulfur oxides.

Several scrubber liquors have been used and/or proposed for the removal of $NO_x$, for example, an aqueous suspension of magnesium carbonate and magnesium hydroxide[2]; a solution of vanadium in nitric acid[3]; ammonium sulfide and ammonium bisulfide[4]; milk of lime[5]; ammonia[6]; urea[7]; sodium sulfite and sodium hydroxide[8,9]; sodium hydroxide[1,9]; hydrogen peroxide[10,11]; and sodium hydroxide and hydrogen peroxide[12,21,25].

Hydrogen peroxide with and without acids or bases has been used to remove $NO_X$ and other acid gases from combustion flue gases, metal pickling operations, fluidized bed gas scrubbers, spray dryers, and nuclear fuel processing operations. However, combustion flue gas scrubbing has been the primary use of hydrogen peroxide in scrubbers. Hydrogen peroxide alone has been added to a single column of a multiple column flue gas system[13,14] or to the entire scrubber solution[15-17] with an efficiency for $NO_x$ that was greater than 90 percent. Hydrogen peroxide has been blended with nitric and/or sulfuric acids to improve the scrubber efficiency when added to a single column of a multiple column flue gas system, which showed significant improvement in the $NO_x$ removal[18,19]. Sodium or potassium hydroxide with hydrogen peroxide has been used to improve scrubber efficiency for flue gases[21] and for general $NO_x$ removal from gas streams[22-25]. For example, the efficiency for nitric oxide (NO) and nitrogen dioxide ($NO_2$) removal improved from 3.8 to 46 percent, respectively, for 1-molar KOH to 91 and 98 percent, respectively, when 0.12-molar $H_2O_2$ was added to the 1-molar KOH[22]. Addition of 50-ppm $Cu^{+2}$ (or $Fe^{+2}$) improved the efficiency of a 5-percent NaOH/3-percent $H_2O_2$ solution from 80.6 to 93.5[23]. Another use of hydrogen peroxide with sodium hydroxide to improve the removal of $NO_x$ involved an initial scrub with $NaClO_2$, which produced $ClO_2$ that was absorbed by NaOH and $H_2O_2$ in a second column[25]. For this example, the $NaClO_2/NaOH/H_2O_2$ system had a removal efficiency of 98.6 for $NO_x$. Addition of hydrogen peroxide to metal pickling baths has been used to lower the $NO_x$ emissions[26-28]. In fact, hydrogen peroxide is used in several analytical methods to oxidize NO and/or the nitrite ion to improve the performance of impingers used for sampling $NO_x$ emissions[12,29-31]. Hydrogen peroxide has been used in nitric acid plants to remove the tail gas which contains a mixture of NO and $NO_2$. These previous studies illustrate that hydrogen peroxide has the potential to oxidize the NO and $NO_2^{-1}$ in the KSC scrubber liquor.

Hydrogen peroxide is reported to be unstable in acid or basic solutions with the maximum stability near a pH of 4[32-34]. However, the largest single use of hydrogen peroxide in the United States is cotton bleaching, where most operations use stabilized alkaline hydrogen peroxide systems. Alkali and alkaline earth silicates (the most effective), phosphates, and organic chelating agents have been used as alkaline stabilizers for hydrogen peroxide.

REACTION OF $NO_2$ WITH WATER. Nitric acid is a very important commercial product that is used as an intermediate in the manufacture of fertilizer. The production process uses the absorption of oxides of nitrogen into water and dilute acids. Because of this industrial need, the adsorption process has been extensively examined for over a hundred years and in spite of this effort, the complex chemistry is not fully understood. There have been many theories proposed to describe transport from the gas phase to the final product. Although, a complete review of this information is beyond the scope of this report, reactions that relate to the oxidizer scrubber process, the absorption processes, and the effects of hydrogen peroxide have been summarized in the following sections.

Reaction Mechanisms. The mechanism for the adsorption of the equilibrium mixture of nitrogen dioxide and nitrogen tetroxide, which is sometimes called "nitrogen peroxide" and designated as $NO_2^*$, has been the subject of many investigations[35-48]. There are four oxides of nitrogen that need to be considered when examining the reaction of nitrogen dioxide with a water-based scrubber liquor. These species [nitrogen dioxide, nitrogen tetroxide, nitric oxide, and dinitrogen trioxide ($N_2O_3$)] exist in equilibrium with one another. Nitric oxide, although not an initial component of the reaction of nitrogen peroxide with water, is formed by the decomposition of nitrous acid in the liquid phase and released back to the gas phase. The reactions of nitrogen tetroxide, dinitrogen trioxide, and nitrogen dioxide in acidic and basic solutions are given below along with the associated electrochemical half-cell reactions.

Reactions of $N_2O_4$ $$2\ NO_{2(g)} \rightleftharpoons N_2O_{4(g)} \quad (1\text{-}1)$$

$$N_2O_{4(g)} \rightleftharpoons N_2O_{4(l)} \quad (1\text{-}2)$$

$$N_2O_{4(l)} + H_2O_{(l)} \rightleftharpoons HNO_{3(l)} + HNO_{2(l)} \quad (1\text{-}3)$$

$$4\ HNO_{2(l)} \rightleftharpoons N_2O_{4(l)} + H_2O_{(l)} + 2\ NO_{(l)} \quad (1\text{-}4)$$

$$N_2O_{4(l)} \rightleftharpoons NO^{+1} + NO_3^{-1} \quad (1\text{-}5)$$

$$NO^{+1} + H_2O \rightleftharpoons HNO_2 + H^{+1} \quad (1\text{-}6)$$

Reactions of $N_2O_3$ $$NO_{(g)} + NO_{2(g)} \rightleftharpoons N_2O_{3(g)} \quad (1\text{-}7)$$

$$N_2O_{3(g)} \rightleftharpoons N_2O_{3(l)} \quad (1\text{-}8)$$

$$N_2O_{3(l)} + H_2O_{(l)} \rightleftharpoons 2\ HNO_{2(l)} \quad (1\text{-}9)$$

Oxidation of $HNO_{2(l)}$ $$2\ HNO_{2(l)} + O_{2(l)} \rightleftharpoons 2\ HNO_{3(l)} \quad (1\text{-}10)$$

Direct Absorption of $NO_{2(g)}$ $$NO_{2(g)} \rightleftharpoons NO_{2(l)} \quad (1\text{-}11)$$

$$2\ NO_{2(l)} + H_2O_{(l)} \rightleftharpoons HNO_{3(l)} + HNO_{2(l)} \quad (1\text{-}12)$$

Gas Phase Reactions of $NO_{2(g)}$ and $N_2O_{4(g)}$ $$3\ NO_{2(g)} + H_2O_{(g)} \rightleftharpoons 2\ HNO_{3(g)} + NO_{(g)} \quad (1\text{-}13)$$

$$N_2O_{4(g)} + H_2O_{(g)} \rightleftharpoons HNO_{3(g)} + HNO_{2(g)} \quad (1\text{-}14)$$

$$3\ HNO_{2(g)} \rightleftharpoons HNO_{3(g)} + 2\ NO_{(g)} + H_2O \quad (1\text{-}15)$$

$$HNO_{3(g)} \rightleftharpoons HNO_{3(l)} \quad (1\text{-}16)$$

Reactions 1-1 through 1-16 illustrate the major steps that are thought to occur during the absorption of nitrogen peroxide into water or water solutions. The primary reactions in the liquid and gas phases are the hydrolysis reactions of nitrogen tetroxide to form nitrous and nitric acids in equal molar quantities, see reactions 1-3 and 1-14. Nitrous acid, formed in these reactions, is a weak acid with an ionization constant of $4.5 \times 10^{-4}$, it decomposes reversibly at a measurable rate to produce nitric oxide and nitric acid. The series of reactions 1-4 through 1-6 are associated with the liquid phase decomposition of nitrous acid and reaction 1-5 is considered to be the rate controlling step.

Reactions 1-7 through 1-10 describe the interaction of $N_2O_3$ with water to form $HNO_{2(l)}$ as the only product. Although formation of $N_2O_{3(g)}$ is not highly favored, its reactions with water are very fast, which makes its contribution to the formation of $HNO_{2(l)}$ significant.

Formation of nitric oxide in the gas phase (see reactions 1-4, 1-13, and 1-15) from solutions with different initial pH values, has been used to indicate if a reaction occurred in the liquid or gas phase. Alkaline solutions were thought to prevent the formation of NO by preventing reaction 1-15; however, several investigators[39,41,42,44] have observed the formation of NO in strong sodium hydroxide solutions. The release of NO and the formation of nitrates from alkaline solutions with $NO_2^*$ or $N_2O_3$ have been explained by water vapor or mist produced by the heat of neutralization[39,42,46]. In addition, reaction 1-15 is reported[48] to occur in strong alkaline solutions to some extent depending upon the mass transfer conditions (liquid-phase transfer of $HNO_2$ and liquid- and gas-phase transfer of NO). Also, two different mechanisms have been proposed for the reaction of $NO_2$ and/or $N_2O_3$ with sodium hydroxide in solution. One group[36,39,41,44] suggests that there are direct reactions (reactions 1-17 through 1-19); and the other group[42], suggests that the initial reactions occur with water (see reactions 1-3, 1-8, 1-12, 1-13, and 1-14).

Liquid Phase Reactions with $NaOH_{(l)}$ $$N_2O_{4(l)} + 2\ NaOH_{(l)} \rightleftharpoons NaNO_{3(l)} + NaNO_{2(l)} + H_2O_{(l)} \quad (1\text{-}17)$$

$$2\ NO_{2(l)} + 2\ NaOH_{(l)} \rightleftharpoons NaNO_{3(l)} + NaNO_{2(l)} + H_2O_{(l)} \quad (1\text{-}18)$$

$$N_2O_{3(l)} + 2\ NaOH_{(l)} \rightleftharpoons 2\ NaNO_{2(l)} + H_2O_{(l)} \quad (1\text{-}19)$$

Electrochemical Half-Cell Oxidation Potentials $$N_2O_{4(l)} + 4\ OH^{-1} \rightleftharpoons 2\ NO_3^{-1} + 2\ H_2O + 2\ e^{-1} \quad -0.85\ V \quad (1\text{-}20)$$

$$NO_3^{-1} + H_2O_{(l)} + 2\ e^{-1} \rightleftharpoons NO_2^{-1} + 2\ OH^{-1} \quad -0.01\ V \quad (1\text{-}21)$$

The half cell reactions, 1-20 and 1-21, can be combined to give the oxidation-reduction reaction 1-17, which has a potential of $-0.86$ V. The free energy, $\Delta G$, for this reaction is negative, which say's that the reaction would occur spontaneously in the indicated direction. Therefore, direct reaction of nitrogen tetroxide with the hydroxide ion should occur spontaneously. Thus, there are two reaction possibilities for nitrogen tetroxide to absorb in alkaline solutions, either directly with water followed by neutralization or directly with the hydroxide ion. however, reaction kinetics indicate that the absorption of nitrogen tetroxide controls the process and that the reaction is pseudo-first order with respect to nitrogen tetroxide[37-39,43,46,49].

Chambers and Sherwood[42] measured the absorption of $NO_2$ in sodium hydroxide (2.7 to 34.1-wt percent) and nitric acid (5.7 to 69.8-wt percent) in a wetted-wall tower and a batch adsorption vessel. The ratio of the effective film thickness for water vapor to that for nitrogen dioxide is essentially the same as the reciprocal ratio of the gas film absorption coefficients. With water at the maximum for each curve, results are similar to the results obtained by Peters and Holman[41] who measured the removal efficiencies for water, 24-wt percent sodium chloride, and 20-wt percent sodium hydroxide.

Other process have been applied to waste streams in attempts to convert the waste to elementally rich compositions which could be used as fertilizer. U.S. Pat. No. 4,119,538 describes the conversion of organic and inorganic residues from fermentation processes to fertilizer by combining the waste liquor residue with inorganic ash.

U.S. Pat. No. 4,514,366 describes the production of liquid fertilizer by using liquid wastewater from a phosphorous smelting furnace. The process involves both the use of phosphorous sludge made at phosphorous furnaces to produce suspension fertilizer and the recovery of phosphorous liquid waste water from the smelting furnace.

U.S. Pat. No. 5,275,639 similarly reacts phosphorous containing sludges with ammonia to produce fertilizer with both phosphorous and nitrogen contributions.

U.S. Pat. No. 5,362,319 describes a process and apparatus for the treatment of unstable solids, such as scrubber solids. Oxidizing agents are provided to convert at least potassium, calcium or magnesium bisulfites to their corresponding sulfate forms. The partial oxidized residue of the sulfate intermediate product may then be completely oxidized by exposure to electromagnetic energy.

U.S. Pat. No. 5,447,637 describes the use of toxic liquid waste streams (phossy water) produced from elemental phosphorous reagent processes. The elemental phosphorous remaining in this toxic residue may be present as a solution, colloidal suspension or macroscopic particles. The phossy water is combined with a neutralizer, and then ammonia, phosphoric acid and suspending clay are combined to form a fertilizer product.

SUMMARY OF THE INVENTION

The process of the present invention comprises a process for the treatment of aqueous streams containing products (e.g., oxy acid(s) of nitrogen) from the reaction of oxides of nitrogen with water. The stream may be a direct effluent of a process or may be a stream created by the water-scrubbing of a vented stream which contained oxide(s) of nitrogen as contaminants. The stream is then contacted with a hydrogen peroxide stream or mass to assure that the oxide(s) of nitrogen product(s) present in the aqueous system is present as nitric acid rather than nitrous acid. The concentration of hydrogen peroxide in a contact area (e.g., reaction zone) between the hydrogen peroxide and the nitric acid stream is maintained at a level of at least 0.1% by weight of the combined nitrogen oxide product(s) in the aqueous stream and the hydrogen peroxide stream. This assures that any oxy acid(s) of nitrogen present will exist as the nitric acid form.

Control of the pH of the combined streams is maintained by the presence of potassium hydroxide additions. The additions are provided upon sensing of the pH of the combined streams indicating that the pH has dropped to an undesirable level.

The present invention describes a process for converting vapor streams from sources containing at least one oxide of nitrogen therein to a liquid fertilizer composition comprising the steps of:

a) directing a vapor stream containing at least one oxide of nitrogen to a first contact zone, b) contacting said vapor stream with water to form oxy acid(s) of nitrogen from said at least one oxide of nitrogen, c) directing said acid(s) as a second stream to a second contact zone, d) exposing said second stream to hydrogen peroxide which is present within said second contact zone to convert at least some of any oxy acid(s) of nitrogen or ions other than in the nitrate form present within said second stream to nitrate ion, e) sampling said stream within said second contact zone to determine the relative amount of hydrogen peroxide within said second contact zone, f) adding hydrogen peroxide to said second contact zone when there is less than an excess of hydrogen peroxide in said second stream, g) adding a solution comprising potassium hydroxide to said second stream to maintain a pH between 5.0 and 11.0 within said second stream within said second contact zone to form a solution of potassium nitrate, and h) removing said solution of potassium nitrate from said second contact zone.

The process of the present invention comprises a process for the treatment of aqueous streams containing products (e.g., oxy acid(s) of nitrogen) from the reaction of oxides of nitrogen with water. The stream may be a direct effluent of a process or may be a stream created by the water-scrubbing of a vented stream which contained oxide(s) of nitrogen as contaminants. The stream is then contacted with a hydrogen peroxide stream or mass to assure that the oxide(s) of nitrogen product(s) present in the aqueous system is present as nitric acid rather than nitrous acid. The concentration of hydrogen peroxide in a contact area (e.g., reaction zone) between the hydrogen peroxide and the nitric acid stream is maintained at a level of at least 0.1% by weight of the combined nitrogen oxide product(s) in the aqueous stream and the hydrogen peroxide stream. This assures that any oxy acid(s) of nitrogen present will exist as the nitric acid form.

Control of the pH of the combined streams is maintained by the presence of potassium hydroxide additions. The additions are provided upon sensing of the pH of the combined streams indicating that the pH has dropped to an undesirable level.

The present invention describes a process for converting vapor streams from sources containing at least one oxide of nitrogen therein to a liquid fertilizer composition comprising the steps of:

a) directing a vapor stream containing at least one oxide of nitrogen to a first contact zone, b) contacting said vapor stream with water to form oxy acid(s) of nitrogen from said at least one oxide of nitrogen, c) directing said acid(s) as a second stream to a second contact zone, d) exposing said second stream to hydrogen peroxide which is present within said second contact zone to convert at least some of any oxy acid(s) of nitrogen or ions other than in the nitrate form present within said second stream to nitrate ion, e) sampling said stream within said second contact zone to determine the relative amount of hydrogen peroxide within said second contact zone, f) adding hydrogen peroxide to said second contact zone when there is less. than an excess of hydrogen peroxide in said second stream, g) adding a solution comprising potassium hydroxide to said second stream to maintain an acid pH (e.g., 2 to 5) in said second stream within said second contact zone to form a solution of potassium nitrate, h) adding additional potassium hydroxide to said second stream to adjust pH to between 5 and 11 within said second stream within said second contact zone to form additional potassium nitrate, and i) removing said solution of potassium nitrate from said second contact zone, or j) adding a solution comprising potassium hydroxide to said second stream to maintain a pH between 5.0 and 11.0 within said second stream within said second contact zone to form a solution of potassium nitrate, and k) removing said solution of potassium nitrate from said second contact zone.

BRIEF DESCRIPTION OF THE DRAWINGS

FIG. 8 is a graph of Efficiency vs. pH for continuous laboratory runs at 1% hydrogen peroxide and approximately 1000 ppm of $NO_2$.

DETAILED DESCRIPTION OF THE INVENTION

Figure 1:
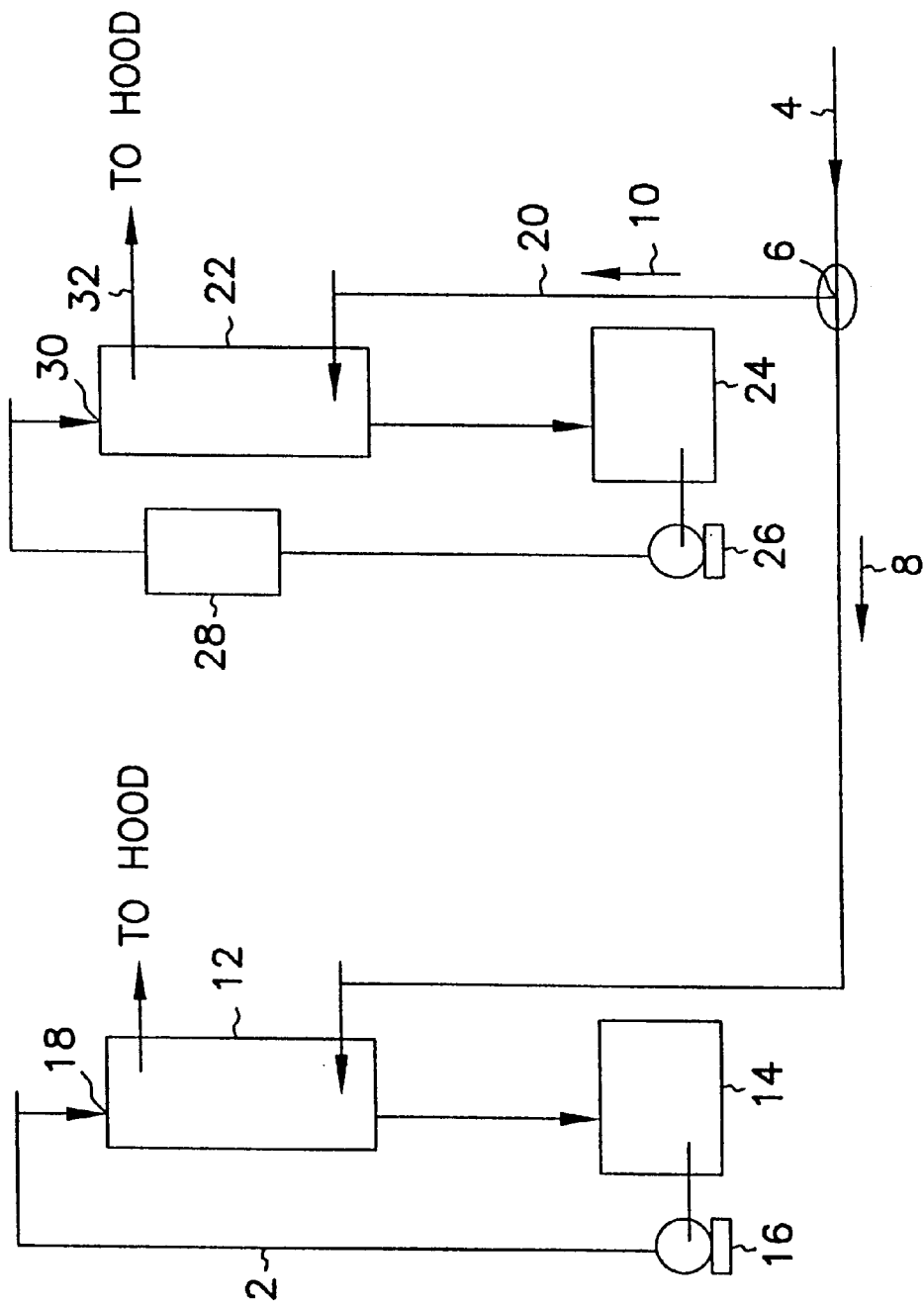
FIG. 1 is a diagrammatic representation of a laboratory test scrubber and safety scrubber.

A new emissions control system for fluid (liquid or gas) streams containing compounds comprising nitrogen and oxygen, particularly compounds selected from hydrazines and nitrogen oxide sources such as nitrogen oxide generating processes, systems and compositions (including oxidizer scrubbers that are used to eliminate current oxidizer liquor waste from hypergol energized propellant systems) is described. The process and apparatus lowers the $NO_x$ emissions from those sources. Since fueling and deserving spacecraft constitute the primary operations in which environmental emissions of nitrogen oxides occur in the U.SD. space program, this process and apparatus will eliminate the second largest waste stream at the Kennedy Space Center (KSC). A recent study found that the efficiencies of the previous oxidizer scrubbers during normal operations range from 70 percent to 99 percent. The previous scrubber solution began with about 25% by weight NaOH, and the resulting effluent comprised about 14.5% NaOH, 9% sodium nitrate and 9% sodium nitrate by weight. The new scrubber liquor starts with about 1% hydrogen peroxide (e.g., 0.5 to 5%) at a pH of about 7 (e.g., 6.0 to 8.0) and the process control system adds hydrogen peroxide and potassium hydroxide to the scrubber liquor to maintain an approximation of those initial conditions, especially a hydrogen peroxide concentration of at least 0.1 %). The result is the formation of an aqueous solution of potassium nitrate, which may then be directly used as a fertilizer. This invention provides the equipment and procedures used to monitor and control the conversion of the scrubber liquor to fertilizer, while reducing the scrubber emissions.

Hypergolic propellants are used in spacecraft such as Space Shuttle, Titan, and other vehicles launched at Kennedy Space Center (KSC) and Cape Canaveral Air Station (CCAS). Fueling and deserving spacecraft constitute the bulk of operations in which environmental emissions occur. Monomethylhydrazine (MMH), nitrogen tetroxide ($N_2O_4$ or "NTO"), and hydrazine ($N_2H_4$ or "HZ") are the main propellants of concern. The scrubber liquor waste generated by the oxidizer scrubbers (approximately 250,000 lb/yr) is the second largest waste stream at KSC. Currently, the waste disposal cost for the oxidizer scrubber liquor is approximately $0.20/lb or $50,000 per year. In addition, a recent study (Parrish, C. and R. Barile, "Hypergolic Oxidizer and Fuel Scrubber Emissions Report", KSC-DL-3332, Sep. 30, 1994) found that the efficiencies of the oxidizer scrubbers during normal operations range from 70 percent to 87 percent at the Orbitor Processing Facility (OPF), and 99 percent at Launch Pads 39A and 39B. An emission estimate of nitrogen tetroxide at KSC based on this study indicates an excess of 200 kilograms emission per year. In an effort to improve these emissions, a study was initiated to examine methods to eliminate the oxidizer scrubber liquor as a waste stream and to lower the scrubber emissions.

As noted earlier, hydrogen peroxide has been used as a scrubber liquor for combustion flue gas scrubbing. Hydrogen peroxide alone has been added to a single column of a multiple column flue gas system (Wet Chemical Procedure for the Removal of Oxides from Flue and Waste Gases," WLB, Wasser, Luft Boden, 36(5), 72, 74–5, (1992), CA117 (22):218837j; "Purifying Combustion Products Prior to Their Discharge to the Atmosphere," Ger. Patent DE 2148244, 1972, CA77(14):92472w) or to the entire scrubber solution ("Boiler Flue Gas Treatment with Hydrogen Peroxide," Japan Patent JP 53135878, 1978, CA90(25) :1911857a; "Simultaneous Removal of Sulfur Dioxide and Nitrogen Oxides from Flue Gases in a Stepwise Reaction with Separate Oxidant Addition," Ger. Patent DE 3642468 A1 880609, 1988, CA109(12):98123j; "Environmental Protection and Material Recovery in Flue Gas Cleaning with Hydrogen Peroxide," Chem. Ind., 115(1), 23–4, (1992), CA116(26):261304z.) with an efficiency for NOx that was greater than 90%. Hydrogen peroxide has been blended with nitric and/or sulfuric acids to improve the scrubber efficiency. When added to a single column of a multiple column flue gas system, hydrogen peroxide showed significant improvement in the NOx removal ("Process for Removing Oxides of Nitrogen from Flue Gases," Ger. Patent WO 8900449, 1989, CA111(2):11958e; "Removal of Sulfur Dioxide and Nitrogen Oxides from Flue Gases," Ger. Patent DE 3436699, 1986, CA104(26):229790w). Sodium or potassium hydroxide (KOH) with hydrogen peroxide has been used to improved scrubber efficiency for flue gases ("The Use of Hydrogen Peroxide for the Control of Air Pollution," Stud. Environ. Sci., 34, 275–92, (1988), CA110 (18):159688s.) and for general NOx removal from gas streams ("Gas Scrubber Using an Alkali Solution Containing Hydrogen Peroxide," Japan Patent JP 48101378, CA80(26) :148789m; "Absorbing Nitrogen Oxides from a Waste Gas with a Solution Containing Hydrogen Peroxide, Hydroxide, and Cupric or Ferrous Ions," Japan Patent JP 49008465, CA80(26):148804n; "Nitrogen Oxide Removal from Gases by Scrubbing," Japan Patent JP 52085979, CA88(10) :65480t; "Conversion of Nitrogen Oxides to Potassium Nitrate). For example, the efficiency for NO and $NO_2$ removal improved from 3.8 to 46%, respectively, using 1 M KOH to 91 and 98%, respectively, when 0.12 M $H_2O_2$ was added to the 1 M KOH(10). Addition of 50 ppm Cu+2 (or Fe+2) improved the efficiency of a 5% NaOH/3% $H_2O_2$ solution from 80.6 to 93.5 ("Absorbing Nitrogen Oxides from a Waste Gas with a Solution Containing Hydrogen Peroxide, Hydroxide, and Cupric or Ferrous Ions," Japan Patent JP 49008465, A80(26):148804n).

Currently, the KSC oxidizer scrubbers react nitrogen tetroxide and/or nitrogen dioxide with nominally 25-wt. % sodium hydroxide, which produces sodium nitrate, sodium nitrite, and nitric oxide. The spent caustic scrubber liquor could be used as a fertilizer once the pH is adjusted; however, substitution of potassium hydroxide for sodium hydroxide increases the commercial value of the scrubber liquor as a fertilizer.

The NOx emissions from the oxidizer scrubbers have been the subject of several investigations at KSC (ÒHypergolic Nitrogen Tetroxide Vapor Scrubber, Phase I Test Report,Ó KSC-DD-777, November 1983; ÒFinal Report, Hypergolic Vapor Scrubber, Phase II (N2O4) & Phase III (MMH) Modification and Test Project,Ó KSCE-3084, December 1986; ÒSulfite-Caustic Tail Gas Scrubber System Test Report and Recommendations, Ó KSCE-824-0010, August 1988; ÒHypergolic Oxidizer Vapor Scrubber Report Phase IV & Phase V Test Results, Ó KSCE-824-0014, April 1989). These investigations have examined the packing materials, scrubber liquor, operating conditions, and addition of various gases in an effort to improve the performance of the oxidizer scrubbers. In one study, (ÒHypergolic Nitrogen Tetroxide Vapor Scrubber, Phase I Test Report,Ó KSC-DD-777, November 1983) a falling film evaporator, used to generate a constant flow rate of NO2 to the scrubber, produced inlet concentrations from 3,200 to over 200,000 parts per million (ppm). The flow rates of gaseous nitrogen (GN2) vented through the scrubber ranged from 0 to 700 standard cubic feet per minute (scfm). As the GN2 flow rate increased, the efficiency decreased; for example, at 150 scfm the efficiency was approximately 90 percent and at 300 scfm the efficiency fell to 60 percent. In addition, when oxygen was added to the GN2, the efficiency of removal of NO increased.

A second series of tests at KSC (ÒFinal Report, Hypergolic Vapor Scrubber, Phase II (N2O4) & Phase III (MMH) Modification and Test Project, Ó KSCE-3084, December 1986) used "Flexiring" and "Sulzer" packing (manufactured by Koch Engineering Company) instead of ceramic saddles, and showed little change in the efficiency of the scrubbers. One interesting observation was the decrease in the efficiency as the inlet concentration decreased for the same GN2 flow rate; for example, at 50 scfm with an inlet concentration of 60,000 ppm, the efficiency was 98 percent and, with an inlet concentration of 500 ppm, the efficiency was 60 percent.

A change of the scrubber liquor from 25-weight-percent sodium hydroxide to 11.6-weight-percent sodium sulfite and 5-weight-percent sodium hydroxide in towers 3 and 4 of the scrubbers was recommended because of the increased efficiency. For example, at 400 scfm and 8,400 ppm inlet concentration, the efficiency for 25-weight-percent sodium hydroxide was 55 percent but with 11.6-weight-percent sodium sulfite and 5-weight-percent sodium hydroxide, the efficiency was 98 percent. However, the change from 25-weight-percent sodium hydroxide to sodium sulfite blend was not made due to safety considerations.

The addition of ozone to the GN2 stream has been examined on the laboratory scale and a significant increase in the scrubber efficiency was found(. Parrish, C., ÒFinal Report, KSC Launch Site Shuttle Nitrogen Tetroxide N2O4 Prototype Scrubber Test Requirements Document, Ó Contract 704357, LSOC, December 1992). For example, when the inlet concentration was 25,800 ppm, the efficiency was 95.8 percent without ozone; and when the inlet concentration was 23,100 ppm, the efficiency was 99.6 percent with ozone.

As part of a project to develop an ecologically safe method for the demilitarization of MK 24 and MK 45 aircraft parachute flares, field tests were performed on sodium nitrate extracted from the process("A 1/10 Scale Pilot Plant for the Ecological Demilitarization of MK 24 and MK 45 Aircraft Parachute Flares," NWSC/CR/RDTR-3, US AND Crane, Crane, Ind., 17 July 1972; "Ecological Demilitarization of MK 24 and MK 45 Aircraft Parachute Flares," NWSC/CR/RDTR-212, US AND Crane, Crane, Ind., 27 July 1972; "Ecological Demilitarization of MK 24 and MK 45 Aircraft Parachute Flares," NWSC/CR/RDTR-213, US AND Crane, Crane, Ind., 27 July 1972). These tests, conducted by Purdue University, monitored the effectiveness of this waste sodium nitrate as a fertilizer. A typical MK 24 or MK 45 parachute flare contains a mixture of 10.4 lb. of magnesium, 6 lb. of sodium nitrate, and 0.6 lb. of a binder. The pilot plant process separated the magnesium from the sodium nitrate. The sodium nitrate was in the form of a water solution, which had a nominal concentration of 5-wt. %.

The fertilizer tests were performed over a period of three years on an established tall fescue sod. The sodium nitrate solution was applied seven times during the three year period. Test plots were established which received from 0 to 150 lb. nitrogen per acre in 30 lb. increments. Urea was used as a control and followed the same application rate. The soil chemical changes, plant tissue nutrient level, and differences in plant height were monitored throughout the test program and recorded as follows:

1. Soil pH—little change
 2. Available phosphorus—no depleting effects
 3. Exchangeable potassium—level declined due to crop removal and increased demand
 4. Exchangeable sodium—reflects application rate
 5. Effect of nitrogen source—reflects application rate
 6. Sodium content in plant tissue—not reflected in plant
 7. Plant analysis (N, P, K, Na, and Ca)—performance similar to urea
 8. Plant height—good response The general conclusion drawn from this study was that after three years the sodium nitrate solution could be used effectively as a fertilizer on grass pastures or established turf at rates as high as 150 lb. nitrogen per acre. Supplemental application of 200 lb. per acre of muriate of potash (0-0-60) was used to replace potassium losses. Phosphorus application rates were 100 lb. per acre of triple super phosphate (0-46-0).

INSTRUMENTATION

FIG. 1 shows a diagram of the laboratory scrubbers 2 used to lower the concentration of the oxidizer before it was released to the laboratory fume hood (not shown), and to provide a test scrubber for the development of a new scrubber liquor. The design of the laboratory scrubbers is similar to the full-scale scrubbers used at KSC. A NO2/GN2 gas mixture enters the system through fluid conduction means 4, which may be tubing resistant to the corrosive effects of the vapor stream. The vapor stream is directed through the scrubber system 2 by a directional flow control means 6 such as a 3-way valve. The flow of the vapor stream may be directed along either or both a test scrubber path 10 or a safety scrubber path 8. Vapor stream passed along the safety scrubber path 8 is first passed into the safety scrubber 12, and then to a scrubber reservoir 14. Fluid flow is maintained in the system not just by any pressure potential in the original flow stream entering through fluid conduction means 4, but also by a pump 16 which is conveniently shown in this FIG. 1 between the safety scrubber 12 and the scrubber reservoir 14 in a portion of the flow path carrying a fluid (e.g., vapor and/or gases) stream from the scrubber reservoir 14 back to the safety scrubber 12 through an inlet means 18. The fluid stream is then carried to a fume hood (not shown).

If the fluid stream is directed towards the test scrubber path 10, there is a first sample point 20 along the path 10 between the directional flow control means 6 and a test scrubber 22. The fluid stream after first entry into the test scrubber 22 is carried to a scrubber reservoir 24. This flow path is similar to that occurring in the safety scrubber flow path 8. A pump or other pressure control system 26 is also provided between the scrubber reservoir 24 and the test scrubber 22. An adjustable rotometer 28 may also be provided between the scrubber reservoir 24 and the entry point 30 for the fluid stream to the test scrubber 30. After venting of the fluid stream from the test scrubber 22 to the fume hood (not shown), a second sample point 32 is provided between the test scrubber 22 and the hood.

The laboratory scrubbers 2 have glass columns (not shown) 3 inches in diameter and are packed with pieces of Tri-Pac 2-inch polypropylene spheres manufactured by Tri-Mer Corporation. The safety scrubber liquor (25-percent sodium hydroxide) is pumped from a second storage reservoir (not shown) to the top of the column where it flows down to the second storage reservoir. Gaseous nitrogen tetroxide ($N_2O_4$ in GN2) flows up the column (not shown) and exits to the fume hood (not shown). This configuration lowers the concentration of oxidizer, which is produced by the sample systems, to levels acceptable for the fume hood.

The test scrubber 22 was equipped with an adjustable rotometer 28 to control the flow rate of the scrubber liquor. Two sample points, one just before the test scrubber 22 and a second 32 just after the fluid stream is vented to the hood, were used to measure the scrubber efficiency. A 3-way valve 6 was used to direct the $N_2O_4$/GN2 flow to the safety scrubber during start-up. Once stable flow of the test gas was established, the valve 6 was rotated to the test scrubber 22. The test scrubber 22 could be operated either in a scrubber liquor recirculating mode or in a single pass mode, where a second reservoir not shown) was used to collect the scrubber liquor from the scrubber 22. Both the safety scrubber 12 and the test scrubber 22 vent to the laboratory fume hood (not shown).

Figure 2:
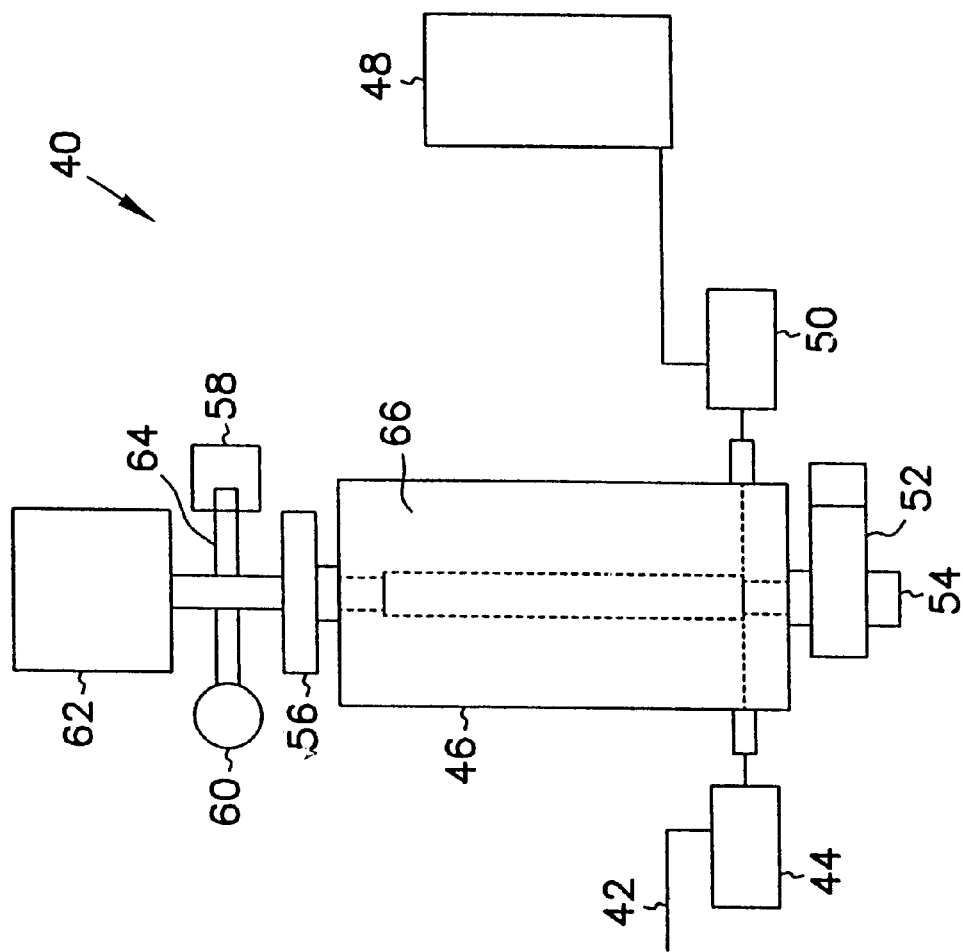
FIG. 2 is a hydrogen peroxide concentration control system used in the preferred practice of the present invention.

As previously noted, one preferred aspect of he present invention is the maintaining of a hydrogen peroxide level in the scrubber liquid of at least about 0.1% by weight of the fluid stream. To accomplish this, a hydrogen peroxide concentration control system 40 is shown in FIG. 2. After sampling of the circulating fluid stream (e.g., sampling of circulating samples of scrubber liquor from sampling points 20 and 32 in FIG. 1), the concentration of hydrogen peroxide is determined offline in an automated peroxide reaction chamber. To maintain the hydrogen peroxide concentration in the scrubber liquor, a portion of the liquor is sampled offline in an automated peroxide reaction chamber (not shown). The output of this device automatically controls the rate of addition of 35% hydrogen peroxide to the circulating scrub liquor. The hydrogen peroxide concentration was controlled by monitoring the pressure generated when sodium hypochlorite was added to a sample of the scrubber solution, see FIG. 2. The reaction of hydrogen peroxide with sodium hypochlorite is given below:

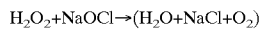

$H_2O_2+NaOCl \rightarrow (H_2O+NaCl+O_2)$

Therefore, the concentration of hydrogen peroxide in the scrubber liquor can be monitored by measuring the pressure change induced by the reaction of liquor with sodium hypochlorite (bleach) in a closed vessel.

The monitoring was accomplished as shown in the apparatus of FIG. 2. Sampled fluid stream enters the hydrogen peroxide control system 40 through inlet 42 which directs the fluid through a metering pump 44 and then into the reaction vessel 46. Sodium hypochlorite solution is stored in a storage tank 48 and fed into the reaction vessel 46 by a metering pump 50. A solenoid valve 52 and attached vent 54 are attached to the reaction vessel 46 to effect release of material from the system 40 after treatment. The reaction vessel is fitted with a gauge guard 56, pressure transducer 58, pressure gauge 60, and pressure switch 62 connected through a stem connection 64.

The reaction vessel 46 was constructed from a 2.25-inch O.D. KYNAR rod. The volume of the reaction chamber 66 is approximately 10 mL. The pressure. switch 62, pressure transducer 58, and pressure gauge 60 are isolated from the reaction chamber 46 with a gauge guard 56 that has a Teflon diaphragm (not shown). A solenoid valve 52 is attached to the bottom of the reaction vessel 46. Two metering pumps (44, 50) supply the scrubber liquor test solution and sodium hypochlorite solution. All wetted parts of this system are made from polymeric materials that are compatible with sodium hypochlorite and/or sodium nitrate. The electrical control system is used to maintain the concentration of hydrogen peroxide in the scrubber liquor. This system consists of a sequence timer (not shown), relay (not shown), pumps (44, 50), valves (not shown) and pressure switch 62. The sequence timer controls the addition of the reagents (scrubber liquor and sodium hypochlorite), the vent valve 54, and the hydrogen peroxide metering pump (not shown).

Figure 4:
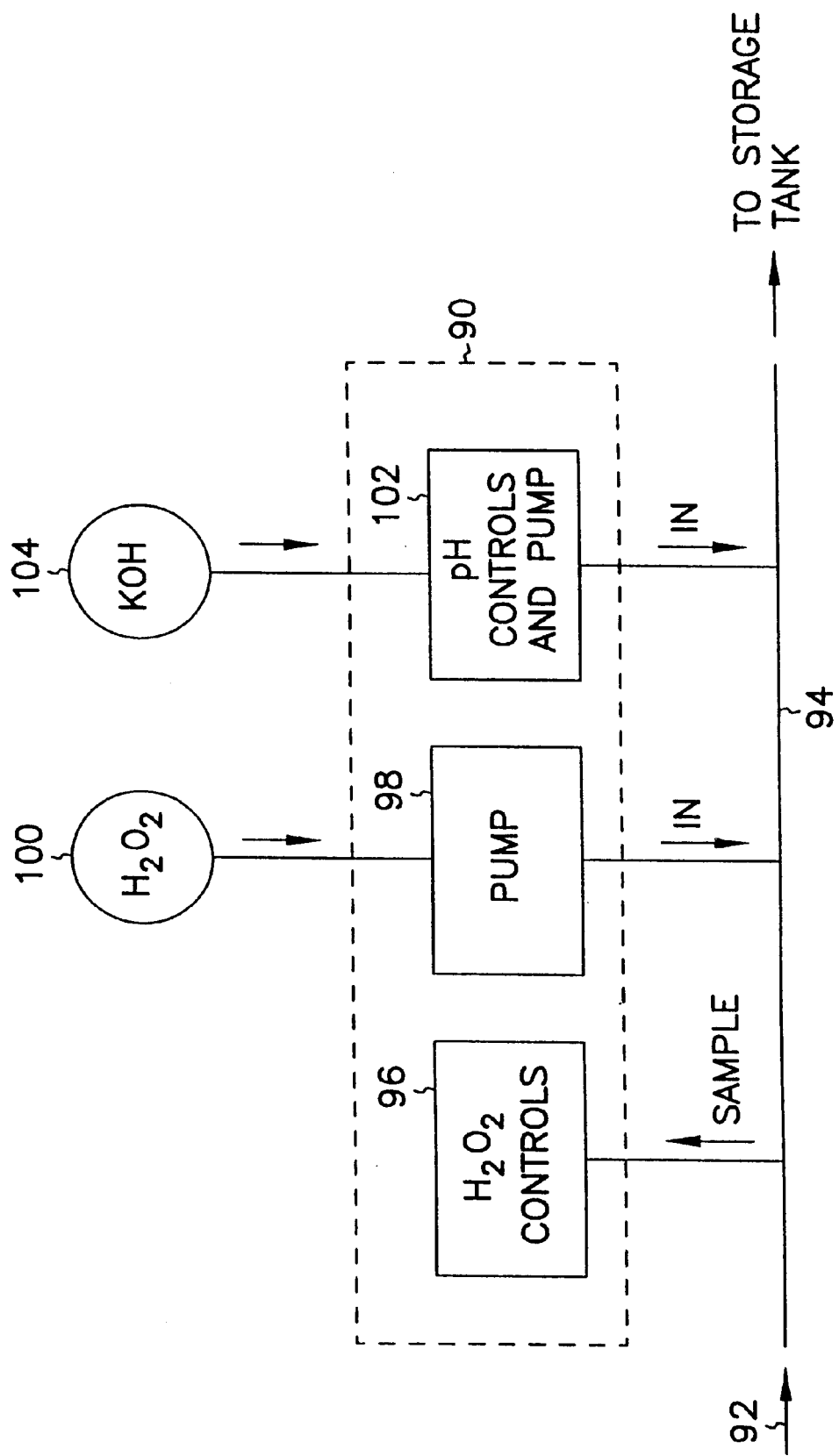
FIG. 4 is a block diagram of a field process control system.

Cole-Parmer model H-56025-40 proportioning pH controller with adjustable flow rates (0 to 5.2 GPH) was selected to control the pH of the scrubber liquor for the laboratory and field tests. This controller responds to 0.1 pH unit changes and can be set to adjust the pH with acid or base feeds. The pumping rate decreases proportionally until the set point is reached. All wetted parts consist of polypropylene, Polytetrafluoroethylene (PTFE), and Viton™ Polyester. The unit 46 has an internal isolation transformer (not shown) to protect the electronics from line voltage fluctuations. This unit is installed in the purged cart (see FIG. 4) that contains the hydrogen peroxide and sampling systems.

Figure 3:
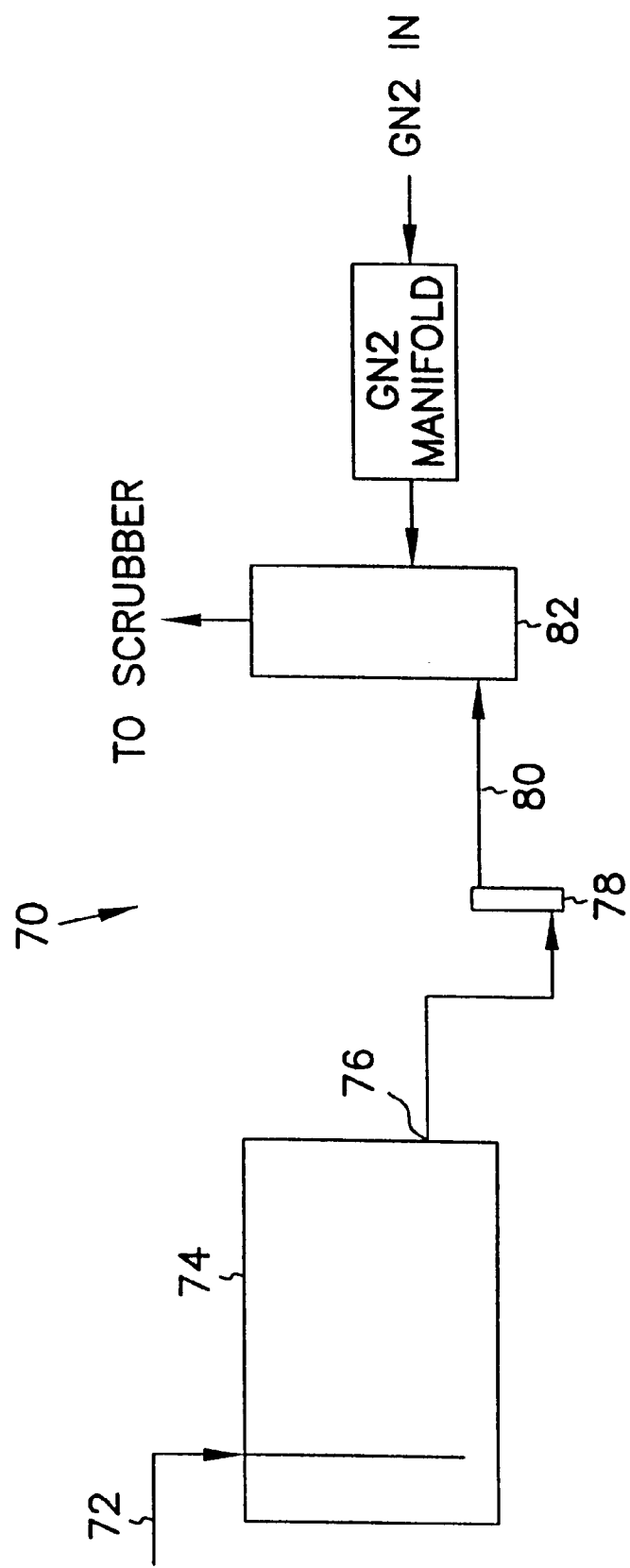
FIG. 3 is a diagrammatic representation of a field oxide of nitrogen sample generating system.

FIG. 3 is a block diagram of the field hypergol sample generating system 70 for the field validation tests. The storage tanks at the oxidizer farms of Launch Pads 39A and 39B (not shown) each have a GN2 purge line for a valve located at the bottom of the oxidizer storage tanks. GN2 will be introduced through this purge line 72 at the bottom of the storage tank 74 and vented at the top of the tank 76 as NTO in GN2, which is passed through a rotometer 78. The temperature and pressure will be measured at a point 80 as the NTO mixture passes from the rotometer 78 to the liquid separator 82 and finally to the scrubber (not shown). The quantity of oxidizer in the storage tank 74 is large enough so there is very little decrease in the tank temperature due to the forced evaporation of NTO. Since the vapor pressure of nitrogen tetroxide is high, it is not necessary to add GN2 to the storage tank 74 to generate a low [less than 5 cubic feet per minute (scfm)] flow rate of NTO through the scrubber. A manifold (not shown) with three orifices (not shown) with nominal flow rates of 100 and 200 scfm is used to generate flows through the scrubber. The flow rates of the GN2 added to the liquid separator can be varied to provide flows of 100, 200, 300, 400, and 500 scfm through the scrubber. This manifold configuration allows the field tests to cover the range of flow conditions found at KSC scrubbers.

The process control system (see FIG. 4) used for the field validation was tested with the continuous tests in the laboratory. This system is packaged in a purged cart 90, which can be used in hazardous locations. The system is designed so that the scrubber liquor pump (not shown) is used to circulate a small flow of sample from the pump discharge line (not shown) through a line 92 to the purged cart 90 and back to scrubber liquor storage tank. A sample is collected from the line at a point 94 in the cart 90 for hydrogen peroxide concentration measurement and pH measurements and either/or hydrogen peroxide or potassium hydroxide are pumped into the line before it is returned to the scrubber liquor storage tank. The purged cart B90B will therefor contain $H_2O_2$ controls 96, an $H_2O_2$ pump 98 connected to an $H_2O_2$ drum or reservoir 100, pH controls and pump 102 connected to a potassium hydroxide drum 104.

Figure 5:
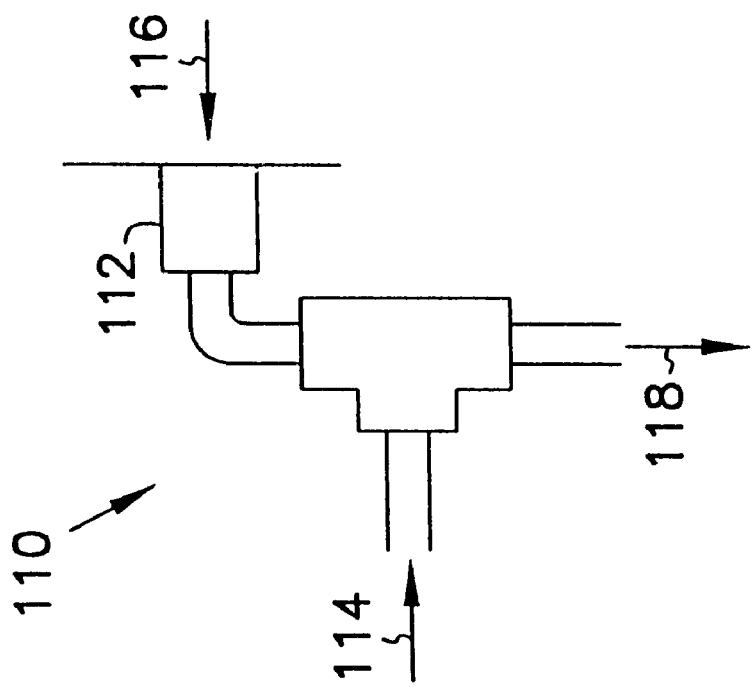
FIG. 5 is a block diagram of a Sample Collection System.
Figure 6:
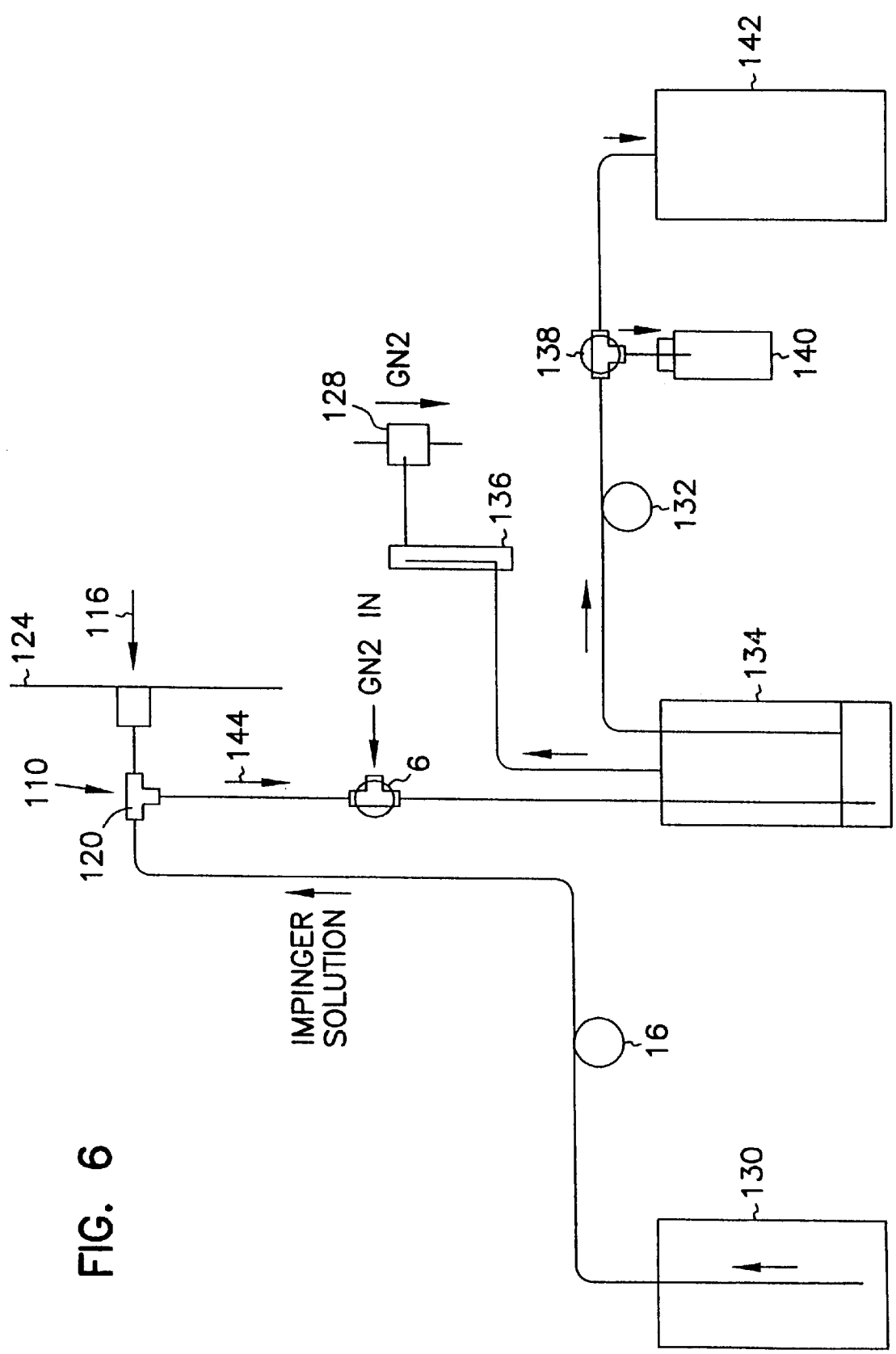
FIG. 6 is a diagrammatic representation of a Sample Collection System for Field Tests.

SAMPLE COLLECTION SYSTEM. The sample collection system 110 for field scrubbers is illustrated in FIGS. 5 and 6. The samples were collected just before the 1st scrubber tower and at a point just after the 4th tower. This sampling arrangement permits easy measurement of the scrubber's efficiency. The actual sample ports are normally used to measure the pressure drop across the scrubber towers and use ¼-inch KC fittings. Our connections are made by removing the existing fittings and inserting a ¼-inch KC mixing tee that is connected to our sample system. This arrangement minimizes the distance (less than 2 inches) between the sample point and the impinger fluid. Samples from the scrubber vent stack enter as 116. The impinger solution enters as 114. The two phase flow exits to the sample system as 118. The arrangement illustrated in FIG. 6 shows how the sample collection system 110 is connected to the scrubber vent system 124 through an existing KC fitting 112. A ¼ inch tee 120 serves to mix the impinger solution with the vapor sample that is pulled from the vent stack by the vacuum generated by the Piab aspirator pumps (not shown). The impinger solution is 0.001-M sulfuric acid that contains 0.1-weight-percent hydrogen peroxide. The impinger solution is supplied from a reservoir 130 on the sample cart.

The sample system illustrated in FIG. 6 consists of four parts: (1) an impinger-solution pumping system which circulates the impinger solution from the storage reservoir to the mixing tee 120 at the sample point, (2) the aspirator system that uses a Piab vacuum pump 128 to pull the sample from the scrubber vent through the mixing tee 120 where the sample is mixed with the impinger solution, and the two-phase mixture is then pulled to the liquid separator 134, where the liquid sample is separated from $GN_2$ (or air), and the $GN_2$ is pulled through a rotometer 136 to the Piab pump 128, (3) the sample collection system that pumps the impinger solution, containing the sample from the liquid separator, through the pump head 132 and then through a 3-way valve 138 where a sample container 140 may be filled or the sample solution pumped to a waste container 142, and (4) a purge system that can blow $GN_2$ through the two-phase sample line 144 to the liquid separator 134, through the mixing tee 138, where impinger solution may be added, and into the scrubber vent not shown). This last operation allows the sample inlet system to be cleaned and dried before a sample is collected. The pumps and other electrical components are contained in the purged sample cart.

Scrubber Liquor Analysis

Analysis of the scrubber liquor provides important information about the scrubber reaction and is a valuable tool in selecting the optimum operating conditions (see table 4-2). For example, selection of the optimum hydrogen peroxide concentration was based on the concentration of nitrite ions in the scrubber liquor, which has a direct effect on the efficiency of the scrubber. Also, measurement of the pH of the scrubber liquor at the top of the scrubber column and at the bottom helps to explain the relationship between the initial pH, the and the observed reaction rate. Since the pH of the scrubber liquor decrease from top to bottom of the scrubber, and the reaction rate for oxidation with hydrogen peroxide is faster in acid solution. Therefore, the increased efficiency observed at an initial pH of 7 is in fact due to the low pH (acidic) at the bottom of the scrubber column, which increases the reaction rate.

TABLE 4-5

A Comparison of the Average Concentration of the Scrubber Liquors as Measured by FTIR and IC

| Run No. | % $NO_2$ FTIR | % $NO_3$ FTIR | % $NO_2$ IC | % $NO_3$ IC | $H_2O_2$ FTIR | pH Start | $H_2O_2$, % Start | L/G |
|---|---|---|---|---|---|---|---|---|
| R01S01A | −0.36 | 1.43 | | | −0.18 | 25% NaOH | | 42.2 |
| R02S02A | | | | 0.08 | | Water | 0.1 | 42.2 |
| R03S03A | | | | 0.04 | | Water | 0.5 | 42.2 |
| R04S04A | | | | | | Water | 1.0 | 42.2 |
| R05S05A | | | | 0.05 | | Water | 5.0 | 42.2 |
| R06S06A | | | 0.04 | 0.04 | | Water | | 42.2 |
| R07S01B | | | | | | 25% NaOH | | 12.6 |
| R08S06C | | | | 0.03 | | Water | | 6.3 |
| R09S05B | | | | 0.08 | | Water | 5.0 | 12.6 |
| R10S03B | 0.04 | 0.14 | | | 0.79 | Water | 0.50 | 12.6 |
| R11S02B | −0.01 | 0.10 | | 0.05 | 0.23 | Water | 0.10 | 12.6 |
| R12S04B | 0.01 | 0.08 | | 0.06 | 1.81 | Water | 1.00 | 12.6 |
| R13S04C | 0.10 | 0.16 | | 0.07 | 1.26 | Water | 1.00 | 6.3 |
| R14SO6C | 0.01 | 0.21 | | 0.06 | 0.13 | Water | 0.00 | 6.3 |
| R15S01C | −1.42 | −1.00 | | 0.03 | 0.02 | 25% NaOH | 0.00 | 6.3 |
| R16SO5C | 0.02 | 0.17 | | 0.60 | 6.11 | Water | 5.00 | 6.3 |
| R17SO3C | 0.03 | 0.27 | | 0.14 | 1.07 | Water | 0.50 | 6.3 |
| R18SO2C | −0.01 | 0.27 | | 0.11 | 0.23 | Water | 0.10 | 6.3 |
| R19SO7A | 0.01 | 0.13 | | 0.04 | 0.18 | 9 | 0.10 | 42.2 |
| R20SO7B | 0.03 | 0.10 | | | 0.15 | 9 | 0.10 | 12.6 |
| R21SO7C | 0.04 | 0.57 | | 0.53 | 0.14 | 9 | 0.10 | 6.3 |
| R22SO8A | 0.07 | 0.37 | | 0.13 | 0.66 | 9 | 0.50 | 42.2 |

TABLE 4-5-continued

A Comparison of the Average Concentration of the Scrubber Liquors as Measured by FTIR and IC

| Run No. | % $NO_2$ FTIR | % $NO_3$ FTIR | % $NO_2$ IC | % $NO_3$ IC | $H_2O_2$ FTIR | pH Start | $H_2O_2$, % Start | L/G |
|---|---|---|---|---|---|---|---|---|
| R23SO8B | 0.06 | 0.21 | | 0.12 | 0.68 | 9 | 0.50 | 12.6 |
| R24SO8C | 0.04 | 0.35 | | 0.13 | 0.69 | 9 | 0.50 | 6.3 |
| R25SO9A | −0.03 | −0.02 | | 0.02 | 1.46 | 9 | 1.00 | 42.2 |
| R26SO9B | 0.04 | 0.19 | | 0.04 | 1.35 | 9 | 1.00 | 12.6 |
| R27SO9C | 0.03 | 0.16 | | 0.08 | 1.35 | 9 | 1.00 | 6.3 |
| R28S10A | 0.03 | 0.10 | | 0.09 | 1.97 | 9 | 5.00 | 42.2 |
| R29S10B | 0.04 | 0.15 | | 0.06 | 6.05 | 9 | 5.00 | 12.6 |
| R30S10C | −0.06 | 0.30 | | 0.14 | 6.20 | 9 | 5.00 | 6.3 |
| R31S11A | −0.11 | 0.17 | | 0.10 | 1.67 | 11 | 0.10 | 42.2 |
| R32S11B | −0.07 | 0.11 | | 0.06 | 0.41 | 11 | 0.10 | 12.6 |
| R33S11C | 0.09 | 0.20 | | 0.09 | 0.26 | 11 | 0.10 | 6.3 |
| R34S12A | −0.03 | 0.13 | | 0.06 | 0.50 | 11 | 0.50 | 42.2 |
| R35S12B | −0.02 | 0.11 | | 0.08 | 0.61 | 11 | 0.50 | 12.6 |
| R36S12C | −0.01 | 0.24 | | 0.09 | 0.54 | 11 | 0.50 | 6.3 |
| R37S13A | −0.15 | 0.12 | | | 1.14 | 11 | 1.00 | 42.2 |
| R38S13B | −0.18 | 0.10 | | | 1.18 | 11 | 1.00 | 12.6 |
| R39S13C | −0.22 | 0.19 | | | 1.20 | 11 | 1.00 | 6.3 |
| R40S14A | −0.29 | 0.15 | | | 2.77 | 11 | 5.00 | 42.2 |
| R41S14B | −0.21 | 0.14 | | | 0.53 | 11 | 5.00 | 12.6 |

TABLE 4-2

A Comparison of the Average Concentration of the Scrubber Liquors as Measured by FTIR and IC (continued)

| Run No. | % $NO_2$ FTIR | % $NO_3$ FTIR | % $NO_2$ IC | % $NO_3$ IC | $H_2O_2$ FTIR | pH Start | $H_2O_2$, % Start | L/G |
|---|---|---|---|---|---|---|---|---|
| R42S15A | −0.56 | −0.27 | | | 0.20 | 10% NaOH | 0.10 | 42.2 |
| R43S15B | −0.59 | −0.18 | | | 0.32 | 10% NaOH | 0.10 | 12.6 |
| R44S15C | −0.55 | −0.17 | | | 0.22 | 10% NaOH | 0.10 | 6.3 |
| R45S16A | −0.86 | −0.04 | | | 0.58 | 10% NaOH | 0.50 | 42.2 |
| R46S17A | 0.05 | −0.15 | | | −0.40 | 5, $H_2SO_4$ | 0.10 | 42.2 |
| R47S17B | 0.04 | −0.15 | | | −0.38 | 5, $H_2SO_4$ | 0.10 | 12.6 |
| R48S17C | 0.02 | −0.12 | | | −0.40 | 5, $H_2SO_4$ | 0.10 | 6.3 |
| R49S18A | 0.01 | −0.19 | | | −0.21 | 5, $H_2SO_4$ | 0.50 | 42.2 |
| R50S18B | −0.01 | −0.20 | | | −0.21 | 5, $H_2SO_4$ | 0.50 | 12.6 |
| R51S18C | 0.03 | −0.15 | | | −0.22 | 5, $H_2SO_4$ | 0.50 | 6.3 |
| R52S19A | 0.02 | −0.19 | | | 0.15 | 5, $H_2SO_4$ | 1.00 | 42.2 |
| R53S19B | 0.01 | −0.21 | | | 0.23 | 5, $H_2SO_4$ | 1.00 | 12.6 |

The data in table 4-5 show that there is significant oxidation of nitrite ions to nitrate ions at all pH values when hydrogen peroxide is present. There is no indication that the conversion of nitrite to nitrate ions increased as the concentration of hydrogen peroxide increased. For example, the series at pH 9.0 show no trend with hydrogen peroxide concentration as measured by FTIR or IC. The data shows that there is fair agreement between the FTIR analysis and IC-titration analysis for nitrate ions, nitrite ions, and hydrogen peroxide concentrations. The negative values for some of the FFIR data, are an indication of the difficulty in knowing the blank's baseline.

As discussed in earlier sections, nitrite ions are unstable and undergo reactions that lead to NO emissions, then the NO is air oxidized to $NO_2$. This process that releases NO which is subsequently oxidized to $NO_2$ in the gas phase, bypasses the scrubber and increases the emissions. The addition of hydrogen peroxide to the scrubber liquor to oxidize the nitrite ions in the liquid phase, prevents the emission of NO which improves the scrubber efficiency.

The data given in table 4-6 shows the weight-percent of nitrite and nitrite ions present in the scrubber liquor for different reaction conditions. The effects of initial pH, UG, hydrogen peroxide concentration, and $NO_2$ concentration were examined for the scrubber solutions. The changes in the concentration of nitrite and nitrate ions in the scrubber liquor were monitored. It should be noted that these scrubber solutions were the same solutions used for the efficiency studies.

As discussed previously, the initial reaction of $NO_2$ with a water-based scrubber liquor is with water to form nitrous and nitric acids in equal molar amounts. Then either the nitrous acid disproportionates to give NO and nitrate ions, it is oxidized by hydrogen peroxide to nitrate ions, or the nitrous and nitric acids are neutralized with the hydroxide ions to form salts. The data in table 4-6 show that the oxidation of nitrite ions to nitrate ions is not affected by the LUG ratio. Only the presence of hydrogen peroxide appears to affect the oxidation of the nitrite ions. Also, a change in pH from 6 to 11 shows little effect on the oxidation as long as some hydrogen peroxide is present. Therefore, the only important parameter for the oxidation of nitrite ions is excess hydrogen peroxide. In order to assure that there is sufficient hydrogen peroxide to oxidize the nitrite ions, the residual concentration was set at 1.0 percent.

TABLE 4-6

Concentration of Nitrite and Nitrate ions in Different Scrubber Liquors at Different L/G Ratios

| Sample | Solution, pH | Wt-% $H_2O_2$ | L/G | Wt-% $NO_2$ | Wt-% $NO_3$ |
|---|---|---|---|---|---|
| R03S03A | Water, 6.0 | 0.5 | 42.2 | 0.00 | 0.04 |
| R05S05A | Water, 6.0 | 5.0 | 42.2 | 0.00 | 0.05 |
| R02S02A | Water, 6.0 | 0.1 | 42.2 | 0.00 | 0.08 |
| R06S06A | Water, 6.0 | 0 | 42.2 | 0.04 | 0.04 |
| R08S06C | Water, 6.0 | 0 | 6.3 | 0.00 | 0.03 |
| R09S05B | Water, 6.0 | 5.0 | 12.6 | 0.00 | 0.08 |
| R11S02B | Water, 6.0 | 0.1 | 12.6 | 0.00 | 0.05 |
| R12S04B | Water, 6.0 | 1.0 | 12.6 | 0.00 | 0.06 |
| R13S04C | Water, 6.0 | 1.0 | 6.3 | 0.00 | 0.07 |
| R14S06C | Water, 6.0 | 0 | 6.3 | 0.00 | 0.06 |
| R15S01C | 25-Wt-% NaOH | 0 | 6.3 | 0.03 | 0.03 |
| R16S05C | Water, 6.0 | 5.0 | 6.3 | 0.00 | 0.60 |
| R17S03C | Water, 6.0 | 0.5 | 6.3 | 0.00 | 0.14 |
| R18S02C | Water, 6.0 | 0.1 | 6.3 | 0.00 | 0.11 |
| R19S07A | NaOH, 9.0 | 0.1 | 42.2 | 0.00 | 0.04 |
| R21S07C | NaOH, 9.0 | 0.1 | 6.3 | 0.00 | 0.53 |
| R22S08A | NaOH, 9.0 | 0.5 | 42.2 | 0.00 | 0.13 |
| R23S08B | NaOH, 9.0 | 0.5 | 12.6 | 0.00 | 0.12 |
| R24S08C | NaOH, 9.0 | 0.5 | 6.3 | 0.00 | 0.13 |
| R25S09A | NaOH, 9.0 | 1.0 | 42.2 | 0.00 | 0.02 |
| R26S09B | NaOH, 9.0 | 1.0 | 12.6 | 0.00 | 0.04 |
| R27S09C | NaOH, 9.0 | 1.0 | 6.3 | 0.00 | 0.08 |
| R28S10A | NaOH, 9.0 | 5.0 | 42.2 | 0.00 | 0.09 |
| R29S10B | NaOH, 9.0 | 5.0 | 12.6 | 0.00 | 0.06 |
| R30S10C | NaOH, 9.0 | 5.0 | 6.3 | 0.00 | 0.14 |
| R31S11A | NaOH, 11 | 0.1 | 42.2 | 0.00 | 0.10 |
| R32S11B | NaOH, 11 | 0.1 | 12.6 | 0.00 | 0.06 |
| R33S11C | NaOH, 11 | 0.1 | 6.3 | 0.00 | 0.09 |
| R34S12A | NaOH, 11 | 0.5 | 42.2 | 0.00 | 0.06 |
| R35S12B | NaOH, 11 | 0.5 | 12.6 | 0.00 | 0.08 |
| R36S12C | NaOH, 11 | 0.5 | 6.3 | 0.00 | 0.09 |

4.3.3 SUMMARY OF SINGLE-PASS LABORATORY TESTS. In summary, the single-pass laboratory tests were able to determine the following:
 a. Hydrogen peroxide can oxidize the nitrite ions to nitrate ions in neutral and acid solutions.
 b. There is a maximum in the scrubber efficiency at an initial pH of 7.
 c. The efficiency is independent of the hydrogen peroxide concentration from 0.1- to 5.0-weight-percent.
 d. The efficiency decreases as the L/G ratio decreases.
 e. The pH decreases from top to bottom of the scrubber column.

The sample collection system for field scrubbers was used to collect samples just before the 1st scrubber tower and just after the 4th tower. This sampling arrangement permits easy measurement of the scrubber's efficiency. The impinger solution is a 0.001 M sulfuric acid solution that contains 0.1 wt-percent hydrogen peroxide. The impinger solution is supplied from a reservoir on the sample cart by a peristaltic pump at approximately 2 mL/min.

The sample system consists of four parts: (1) an impinger solution pumping system, which circulates the impinger solution from the storage reservoir to the mixing tee at the sample point; (2) the aspirator system, that uses a PIAB (Manufacturing Co. of the air eductor) vacuum pump to pull the sample from the scrubber vent through the mixing tee, where the sample is mixed with the impinger solution, and the two-phase mixture is then pulled to the liquid separator, where the liquid sample is separated from GN2(or air), and the GN2 is pulled through a rotometer to the PIAB pump; (3) sample collection system, which-pumps the impinger solution that contains the sample from the liquid separator, through the pump head and then through a 3-way valve where a sample container may be filled or the sample solution pumped to waste; and (4) a purge system that can blow GN2 through the two-phase sample line from the liquid separator, through the mixing tee, where impinger solution may be added, and into the scrubber vent. This last operation allows the sample inlet system to be cleaned and dried before a sample is collected. The pumps and other electrical components are contained in the purged sample cart.

EXAMPLE

This Example was divided into a laboratory proof-of-concept (POC) study and a full-scale study. The laboratory POC study measured the effects of hydrogen peroxide with and without added acid or base as the scrubber liquor, and the effects of a change from sodium hydroxide to potassium hydroxide. These studies provide data on the scrubber efficiency, quality of fertilizer, and an estimate of the costs savings. The laboratory POC study was done at approximately 1000 ppm of $NO_2$ in GN2 with total gas flow rates of 3, 10, or 20 L/min and a scrubber liquor flow rate of 150 mL/min, which gave Liquor to Gas (L/G) ratios of 42, 12.6 or 6.3, respectively. The pH of the scrubber liquor ranged from 1.7 to 25 wt-% NaOH and the concentration of hydrogen peroxide ranged from 0.1 to 5 vol-%. The oxidizer area of KSC's hypergol storage farm for Pad 39B was used for the full-scale tests. These full-scale tests used the sampling system developed previously (1) to measure the scrubber efficiencies for N02 concentrations of approximately 5000 ppm and flow rates from 100 to 500 SCFM. The analytical methods used for the laboratory phase of this study were used for the full-scale tests.

The analytical methods described in this section were required to analyze the used scrubber liquor, the hydrogen peroxide concentration in the test scrubber liquors before use, and the gas-phase emissions from an oxidizer scrubber for this study. Initially, the gas-phase analytical method for NOx used ASTM method D 1608–77(23), which had previously been used to develop a new procedure for monitoring the emissions from the oxidizer scrubbers at KSC (Parrish, C. and R. Barile, "Hypergolic Oxidizer and Fuel Scrubber Emissions Report", KSC-DL-3332, Sep. 30, 1994). Although this method is useful over the range from 5 to 2000 ppm, the procedure is very slow and labor intensive. Therefore, a new method, based on ion chromatography, was developed. Analysis of the scrubber liquor was complicated by the presence of two oxidizing agents, nitrate ions and hydrogen peroxide, and nitrite ions, which meant that analytical methods based on oxidation/reduction characteristics of the analyte could not be used. Analysis of the scrubber liquor was important, first, to study changes that occurred due to different scrubber liquors, and second, for the development of a process control system.

Hydrogen peroxide concentrations were measured by titrating with KMnO4 and FTIR (Fourier Transform Infrared) method was developed for assaying hydrogen peroxide in scrubber liquors, that contained nitrite and nitrate ions, and employed anion exchange resins. Standard solutions of NOx ions and peroxide were mixed with the resins, after which nitrite.was assayed by the. Saltzman method and nitrate by ASTM D 1608. Both Amberlite™ IRA-400 and Dowex™ Macroporous Resin MSA-2 worked well in absorbing NOx ions. These results indicated that nitrate and nitrite ions were removed to the extent that there was no interference to peroxide titration's with KMnO4. Rotometers were used to measure. the flow rates of the scrubber liquor.

The IC method was based on standard anion techniques and used a HP DX 500 IC system that operated under their PeakNe™ Chromatography Workstation software. The DX 500 system is based on a LC20 enclosure, GP40 gradient pump, ED40 electrochemical detector, and an AS40 automated sampler. An AS4 column was used for the anion analysis. The autosampler used 5 mL filter sample tubes and injected 0.100 mL samples into the IC. A series of 4 to 6 nitrite and nitrate ion standards as NO2 were prepared with concentrations of 100 to 5000 ng/mL. Typically, the calibration curves covered the range from 10 to 500 ng; however, some of the initial studies covered the range 10 to 5000 ng.

RESULTS

This program was divided into three major tasks to determine the design for the control system for continuous, unattended operation at the oxidizer scrubbers. First, the laboratory investigations monitored the changes in the composition of scrubber liquors during single passes down the packing countercurrent to the flow of $NO_2$. Second, the laboratory scrubber was operated in a continuous mode where the scrubber liquor circulated from a reservoir to the scrubber packing and returned to the reservoir. Finally, there will be tests of a full-size scrubber (Pad 39B) to monitor changes in the scrubber efficiency and to prepare samples of scrubber liquor to be evaluated as a fertilizer. In addition to these primary objectives, methods to control the concentration of the scrubber liquor and analytical methods to measure the concentrations were developed and tested in the laboratory and field at Pad 39B oxidizer farm.

The effect of pH on the efficiency appears to pass through a maximum around a pH of 7 and then drops on either side for the single pass laboratory tests, see FIG. 5. (pH ranges within the scrubbers of from 6.0 to 8.0 are therefore particularly desirable, with pH levels of 6.5 to 7.5 preferred.) In these tests the scrubber liquor was pumped to the scrubber and to a waste container and samples were collected and tested for nitrite, nitrate, and hydrogen peroxide concentrations and pH. Typically, there was a significant drop in the pH during the single pass runs. For example, when water was used as the scrubber liquor (initial pH 7) the pH dropped to 2 for a single pass through the scrubber when the $N_2$ concentration was 1000 ppm.

Figure 7:
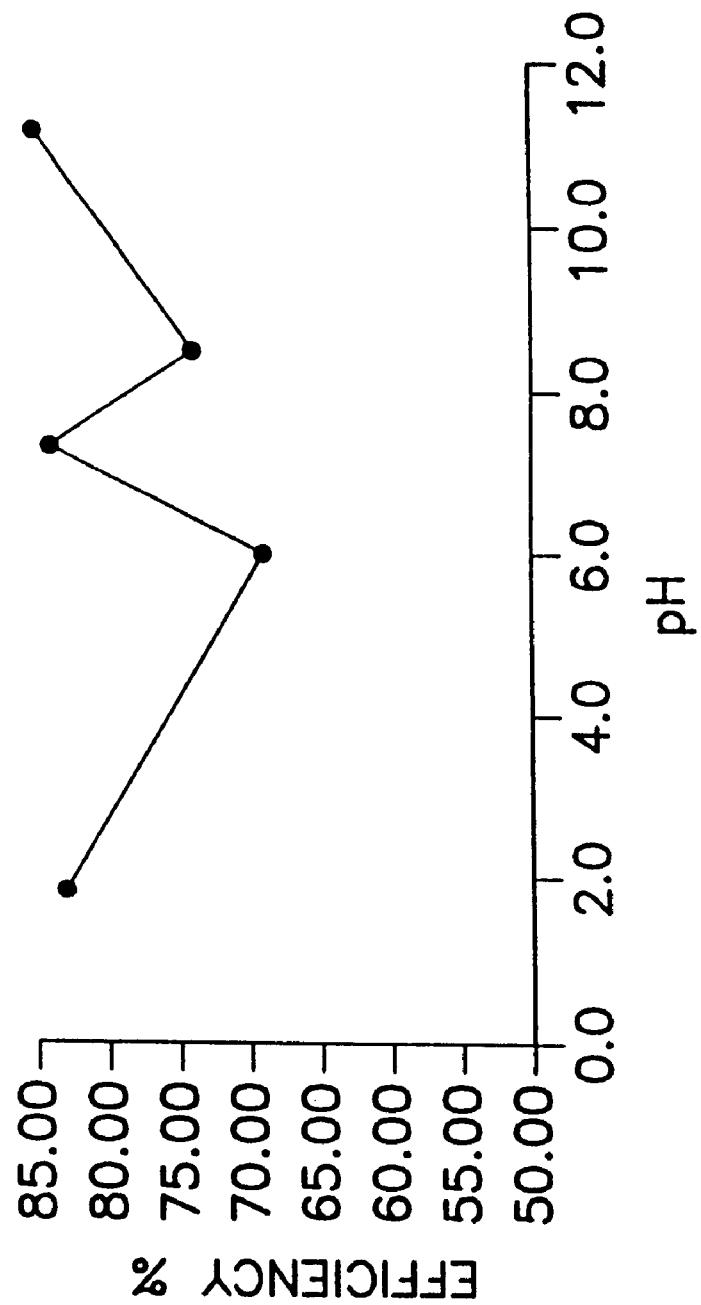
FIG. 7 is a graph representing Efficiency vs pH at various peroxide concentrations at L/G of 12.6.

FIG. 7 is a Graph Representing Efficiency vs pH at Various Peroxide Concentrations at LG of 12.6

The same decrease in efficiency with the pH around 7 was observed in the continuous runs as well, except in this case the pH range extended beyond the range of the single pass tests and then the efficiency appeared to increase. These changes for the continuous laboratory experiments are illustrated in FIG. 6. Increase in peroxide reactivity has been observed for acidic and alkaline solutions and has been attributed to the increased instability of hydrogen peroxide. FIG. 8 is a graph of Efficiency vs. pH for Continuous Laboratory Runs at 1% Hydrogen Peroxide and Approximately 1000 ppm of $NO_2$ The effect of hydrogen peroxide on the efficiency is illustrated in FIGS. 8 and 9. These represent tests where the pH was held constant and the amount of hydrogen peroxide was varied. FIG. 7 illustrates the results where the peroxide concentration is increased from 0.1 to 1.0 percent which shows efficiencies around 96% as compared to an efficiency of around 76% for 25-wt% sodium hydroxide.

FIG. 9 is a Graph of Efficiency for Various Scrubber Liquors at UG of 12.6

FIG. 9 shows a similar effect for the continuous laboratory runs as compared to water. The pH for these tests was approximately 7.5 and the UG ratio was constant. In this case there were significant increases in the scrubber efficiencies when hydrogen peroxide was added to the scrubber liquor over water.

FIG. 10 is a Graph of the Effect of Hydrogen Peroxide on the Efficiency of the Laboratory Scrubber for Continuous Runs Analysis of the scrubber liquors for the presence of nitrite ions indicated that the oxidation with hydrogen peroxide had oxidized all of the nitrite ions to nitrate ions, which was one of the objectives for the addition of hydrogen peroxide to the scrubber. Without the presence of hydrogen peroxide the concentration of nitrite and nitrate ions is almost equal. Since nitrite ions disproportionate to form nitric oxide and nitrate ions, oxidation of the nitrite ions is desirable to lower the emissions of NO.

The primary objectives of this work were achieved in developing a new scrubber liquor that was less expensive to use than the current 25-wt % sodium hydroxide when all factors were considered including waste disposal, preparation of the scrubber liquor, and handling a hazardous waste (the spent oxidizer scrubber liquor). Improvement in the scrubber efficiencies is the second most important accomplishment of this study, and these changes are significant.

A convenient method for control of the hydrogen peroxide concentration was developed for this study. This device uses the pressure generated when hydrogen peroxide is decomposed with bleach to sense the concentration of hydrogen peroxide in the scrubber liquor.

Peters and Holman[41] found that water had the highest removal efficiency followed by sodium hydroxide and sodium chloride, and they concluded that the major reactions occur in the gas-film and liquid-film at the boundaries between the two phases. In addition, they found that the presence of NO in the exit gas, when sodium hydroxide was present, indicated the existence of a gas-phase reaction, and that the rate of this gas phase reaction is proportional to the partial pressure of water vapor. Chambers and Sherwood[42] found similar relationships between absorption efficiency and the vapor pressure of water over sodium hydroxide and nitric acid solutions.

Different absorbent solutions and test conditions have been used to help explain the mechanism of the absorption of $NO_x$ into water and in particular whether diffusion resistance or chemical reaction kinetics is the limiting factor. It is now generally agreed that the pseudo-first-order reaction of nitrogen tetroxide with water, reaction 1-3, is the limiting step. If the reaction with water vapor to produce NO contributed significantly to the total absorption of $NO_2^*$, then conditions which increase the concentration of water vapor should increase the absorption rates.

Several factors have been examined to determine if the overall reaction is controlled by chemical kinetics of the reacting species or diffusion across the gas/liquid boundary. Much attention has focused on the gas-liquid boundary and the observed mist formation during the adsorption process. These concepts are examined in the following section, which attempts to explain the current theories that are used to describe the absorption of oxides of nitrogen in water, acid, alkaline, and hydrogen peroxide solutions.

Adsorption Theory. The theory of absorption process has been the subject of many studies and there are several views of the physical picture and its relationship to the experimental data. Two theories, that have been examined in much detail, are the stagnant two-film theory with a finite thickness and the unsteady-state-diffusion into a stagnant liquid (the penetration theory)[44], these models are summarized in the following sections. There are many chemical processes that involve the absorption of a gaseous reactant into a solution of a second reactant. However, our attention is focused only of the absorption of oxides of nitrogen in water, acidic and alkaline solutions, and dilute hydrogen peroxide solutions. The Two-Film Theory. Hoftyzer[35] and Weisweiler[37] proposed that the transport of $N_2O_4$ from the bulk gas region to the gas-film-liquid-film interface is the rate limiting step. Several reactions (1-22 through 1-29) occur between the gas-phase species in this interface and in the liquid film, and these are listed below.

Gas Film Boundary Interface Liquid Film Boundary

The difference between the initial gas pressure, $p^o$, and gas pressure at the interface, $p^i$, is given by $(p^o - p^i)$, the driving force for the gas transfer process. Since the concentration of water is large compared to the concentration of $NO_2^*$, then the concentration of water can be considered constant, which gives a pseudo first-order reaction for $NO_2^*$ with water.

Bulk Gas

| | | |
|---|---|---|
| $N_2O_4$ | 2 $NO_2$ | (1-22) |
| $NO + NO_2$ | $N_2O_3$ | (1-23) |

Gas-Film-Liquid-Film Interface

| | | |
|---|---|---|
| $N_2O_4$ | 2 $NO_2$ | (1-24) |
| $NO + NO_2$ | $N_2O_3$ | (1-25) |

Liquid Film

| | | |
|---|---|---|
| $N_2O_4 + H_2O$ | $HNO_3 + HNO_2$ | (1-26) |
| 2 $NO_2 + H_2O$ | $HNO_3 + HNO_2$ | (1-27) |
| $N_2O_3 + H_2O$ | 2 $HNO_2$ | (1-28) |

Bulk Liquid

| | | |
|---|---|---|
| 3 $HNO_2$ | $HNO_3$ + 2 NO + $H_2O$ | (1-29) |

The reaction of $HNO_2$ in the liquid phase is the source of NO from this process. Since NO has very low solubility in water, it is released from the liquid phase where it can react with $NO_2$ in the gas film or escape to the gas phase. The quantity of $N_2O_4$ transported is controlled by the position of the dimerization equilibrium and the transport of $N_2O_4$ across the gas-liquid interface. The rate can be expressed as follows:

$$J_{N_2O_4} = \frac{k_{gNO_2}}{2RT}(p^o_{NO_2} - p^i_{NO_2}) + \frac{k_{gN_2O_4}}{RT}(p^o_{N_2O_4} - p^i_{N_2O_4}) \quad (1\text{-}30)$$

where
J=adsorption rate, kmol m$^{-2}$S$^{-1}$
$k_g$=gas-side mass-transfer coefficient, m/s
$p^o$=partial pressure in the bulk gas, atm
$p^i$=partial pressure at the interface, atm As the concentration of $NO_2$ increases, $N_2O_4$ is the primary substance that crosses the interface to produce nitric and nitrous acids, in a fast first order reaction. Nitrous acid then dissociates to produce NO (see example above under liquid phase reactions), which is then transported from the liquid phase to the gas phase. The absorption rate of $N_2O_4$ can be written as:

$$J_{N_2O_4} = H_{N_2O_4} p_{N_2O_4} \sqrt{kD_{N_2O_4}} \quad (1\text{-}31)$$

Where
J=absorption rate, kmol m$_{-2}$S$^{-1}$
H=Henry coefficient, m$^3$ atm/kmol
k=rate constant, s$^{-1}$
D=diffusion constant, m$^2$/s The Penetration Theory. The penetration theory, or unsteady state plus reaction theory, proposed by Higbie[39], mathematically combines the effects simultaneous diffusion and chemical reaction in the liquid phase on the absorption process. The conditions for the penetration theory are listed below:

a. The liquid phase is in laminar motion with no mixing taking place during absorption.
b. No concentration gradients exist in the liquid before exposure to the gas.
c. Molecules of the absorbent gas diffuse into the liquid only a very short distance.
d. A physical equilibrium exists at the gas-liquid interface.

Wendel and Pigford[39] found that the reaction of nitrogen peroxide and water was the rate determining step when mixtures of $NO_2^*$ and $N_2$ were absorbed in wetted-wall columns. They found a linear relationship between the nitrogen tetroxide concentration in the gas phase and the absorption rate in water. Also, they found no effect on the absorption rate for a change in the liquid flow rate or a tenfold change in the gas-liquid contact time (0.03 to 0.3 sec), which indicates that the rate-controlling step is the hydrolysis of nitrogen tetroxide. The penetration theory, initially proposed by Higbie and modified by Danckwerts[40], Sherwood and Pigford[44], and Wendel and Pigford[39], is described below for the absorption of nitrogen peroxide in water and water solutions to produce nitric and nitrous acids. Equation 1-32 gives the rate of reaction of nitrogen tetroxide with water.

$$N_A = \sqrt{k_c D}(c_i)_{N_2O_4} \qquad (1\text{-}32)$$

Where $(C_i)_{N_2O_4}$ is the concentration at the interface of the dissolved but unreacted nitrogen tetroxide in water, D is the diffusivity of nitrogen tetroxide in water, and $k_c$ is the reaction rate constant for the hydrolysis of nitrogen tetroxide.

Equation 1-32 can be rewritten to give equation 1-33.

$$\frac{N_A}{(p_i)_{N_2O_4}} = \sqrt{k_c}\,\frac{(c_i)_{N_2O_4}}{(p_i)_{N_2O_4}} \qquad (1\text{-}32)$$

The equilibrium constant for the physical solution of nitrogen tetroxide is given by reaction 1-2, which has an equilibrium constant $K_1$. The expression to the left in equation 1-32, the average absorption rate (g-moles $N_2O_4$/cm² atm) divided by the partial pressure of $N_2O_4$ (atm), is a measure of the solubility of the unreacted nitrogen tetroxide with water. The reaction rate constant for the hydrolysis of nitrogen tetroxide, reaction 1-3, is given by equation 1-33.

$$k_c = \left|\frac{N_A}{(p_i)_{N_2O_4}}\right|^2 \frac{1}{D}\left(\frac{1}{K_1}\right)^2 \qquad (1\text{-}33)$$

Although equation 1-33 provides a reaction rate constant for the hydrolysis of nitrogen tetroxide, the decomposition of nitrous acid must be considered to obtain a reaction rate constant for the absorption reaction. Reactions 1-4 through 1-6 summarize the mechanism for the decomposition of nitrous acid, where reaction 1-5 is the rate controlling step. The net reaction shows that three molecules of nitrous acid decompose for each molecule of nitrogen tetroxide that is absorbed. Reaction 1-4 is fast and has an equilibrium constant that is shown in equation 1-34 and the reaction rate equation 1-35.

$$K_2 = \frac{(N_2O_4)(p_{NO})^2}{(HNO_2)^4} \qquad (1\text{-}34)$$

$$-\frac{d(HNO_2)}{dt} = k_1 \frac{(HNO_2)^4}{(p_{NO})^2} \qquad (1\text{-}35)$$

The rate of loss of nitrogen tetroxide for reaction 1-3 is shown in equation 1-36.

$$-\frac{d(N_2O_4)}{dt} = k_c(N_2O_4) \qquad (1\text{-}36)$$

Where $k_c$ is the reaction rate constant for the hydrolysis of nitrogen tetroxide, which is ⅓ the value for the rate of loss of nitrous acid, equation 1-37. Therefore, $k_c$ can be expressed as the following:

$$k_c = \frac{1}{3}\frac{k_1}{K_2} \qquad (1\text{-}37)$$

If the equilibrium constant $K_1$ is substituted into equation 1-33, then a new equilibrium constant $K_3$, the ratio of $K_2$ to $K_1$, can be defined. The reported electrode potentials at 25° C. for the decomposition of nitrous acid in acid solution, reaction 1-38, and the acid hydrolysis of nitrogen tetroxide, reaction 1-39, are 0.98 and 1.07 volts respectively. The resulting reaction, 140, has a potential of −0.09 volts. The value of the equilibrium constant, $K_3$, is $9.1 \times 10^{-4}$ atm³L⁴/g-mole⁴ at 25° C.

$$2\,HNO_{2(l)} + 2\,H^{+1} + 2\,e^{-1} \quad 2\,NO_{(g)} + 2\,H_2O_{(l)} \qquad (1\text{-}38)$$

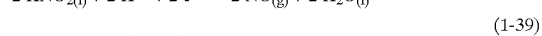
$$N_2O_{4(g)} + 2\,H^{+1} + 2\,e^{-1} \quad 2\,HNO_{2(l)} \qquad (1\text{-}39)$$

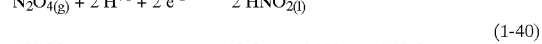
$$4\,HNO_{2(l)} \quad N_2O_{4(l)} + 2\,NO_{(g)} + 2\,H_2O \qquad (1\text{-}40)$$

Since the hydrolysis of nitrogen tetroxide was the rate controlling step for the absorption of $N_2O_4$ into water and water solutions, then the reaction rate constant, $k_c$, equilibrium constant, $K_1$, activation energy, $E_a$, and Henry's Law constant, H, can be used to model the absorption process. These values at 25° C. are summarized below:

a. the reaction rate constant, $k_c$, 290 sec$^{-1}$
b. equilibrium constant, $K_1$, $9.55 \times 10^{-4}$ g-moles/(cm)³ (atm)
c. activation energy, Ea, 18.8 k-cal/g-mole
d. Henry's Law constant, H, 58 atm/(g-moles $N_2O_4$)/(g-mole solution)

Summary of Absorption Models. Two models for the absorption of nitrogen peroxide into water have been summarized above. These two models were selected because they represent the most referenced approaches that are based on a stationary system. Newer dynamic models based on based on physico-chemical laws are reported in the current literature; however, presentation of these models is beyond the scope of this report. The two models presented above, the two-film theory and the penetration theory, have been used for many years to explain the absorption processes, including the absorption or nitrogen peroxide in water. The primary differences between the models is the process that is believed to be controlling the rate of absorption. Both models support the concept that nitrogen tetroxide is the rate controlling species. However, they are based on different rate controlling process, e.g. the two-film theory proposes that diffusion of nitrogen tetroxide across the gas-liquid-film interface is rate controlling and the penetration theory proposes that the hydrolysis of nitrogen tetroxide is rate controlling. The available experimental data is used with both approaches to explain the absorption process.

REACTIONS WITH HYDROGEN PEROXIDE. For a scrubber liquor to be effective in lowering the $NO_x$ emissions, the nitrite ion must be oxidized to the nitrate ion in the liquid phase or NO must be oxidized in the gas phase. The oxidation of nitrite ions with hydrogen peroxide in acidic and alkaline conditions is examined by the oxidation potential and the reaction mechanism.

Reaction Potentials. Since the scrubber can potentially operate in acidic or alkaline conditions, it is worthwhile to examine the oxidation potentials[50,51] for the reactions of hydrogen peroxide with oxides of nitrogen in acidic and basic solutions. Then oxidation potentials that give a negative ΔG, free energy, can be used to predict the direction of the spontaneous reaction. Also, the combination of half-cell reactions that give the greatest voltage will be the limiting reaction for the reagents involved.

Acid Solutions $$N_2O_{4(g)} + 2 H_2O_{(l)} \quad 2 NO_3^{-1} + 4 H^{+1} + 2 e^{-1} \quad +0.803 V \quad (1\text{-}39)$$

$$H_2O_{2(l)} + 2 H^{+1} + 2 e^- \quad 2 H_2O_{(l)} \quad -1.776 V \quad (1\text{-}40)$$

$$HNO_{2(l)} + H_2O_{(l)} \quad NO_3^{-1} + 3 H^{+1} + 2 e^{-1} \quad +0.94 V \quad (1\text{-}41)$$

$$NO_{(l)} + 2 H_2O_{(l)} \quad NO_3^{-1} + 4 H^{+1} + 3 e^{-1} \quad +0.96 V \quad (1\text{-}42)$$

$$NO_{(l)} + H_2O_{(l)} \quad HNO_{2(l)} + H^{+1} + e^{-1} \quad +1.00 V \quad (1\text{-}43)$$

$$2 NO_{(l)} + H_2O_{(l)} \quad N_2O_{4(l)} + 2 H^{+1} + 4 e^{-1} \quad +1.03 V \quad (1\text{-}44)$$

$$2 HNO_{2(l)} \quad N_2O_{4(l)} + 2 H^{+1} + 2 e^{-1} \quad +1.07 V \quad (1\text{-}45)$$

There are several possible oxidation reactions for $NO_{(1)a}$ and $HNO_{2(l)}$; however, reactions 1-39 and 1-40 give the largest potential difference for the reactants. Use of nitrogen tetroxide in the gas phase vs. the liquid phase for the electrochemical reactions would not change the oxidation state, thus there would be no change in the reaction potentials. When these reactions (1-39 and 1-40) are combined, the overall reaction, 1-46, is spontaneous, produces only nitric acid, and is independent of the hydrogen ion concentration. The chemical reaction kinetics are not necessarily controlled by the electrochemical processes, i.e., diffusion of the reacting components through the gas-liquid interface or concentrations of reacting components. Also, additional reactions that are not involved in the electrochemical processes may be required to fully illustrate the reaction mechanism.

$$N_2O_{4(l)} + H_2O_{2(l)} \quad 2 HNO_{3(l)} \quad -0.973 V \quad (1\text{-}46)$$

Basic Solution

Electrochemical reactions can be used to predict whether a reaction will occur spontaneously; however, the reaction rate is controlled by many other factors. Examination of the potential electrochemical reactions that led to the absorption of nitrogen peroxide in basic solution, shows that there are no known reactions. This means that the absorption process is with water, to form nitric and nitrous acids, which is then neutralized with base. Key reactions that describe this process are given below. For example, reaction 1-47 illustrates the ionization of hydrogen peroxide, reaction 1-49 shows the oxidation of the $HO_2^{-1}$ ion, and reaction 1-50 shows the reduction of nitrate ion.

$$H_2O_{2(l)} \rightleftharpoons HO_2^{-1} + H^{+1} \quad (1\text{-}47)$$

$$H^{+1} + OH^{-1} \rightleftharpoons H_2O_{(l)} \quad (1\text{-}48)$$

$$HO_2^{-1} + OH^{-1} \quad O_2 + H_2O_{(l)} + 2 e^{-1} \quad -0.076 V \quad (1\text{-}49)$$

-continued $$NO_3^{-1} + H_2O_{(l)} + 2 e^{-1} \quad NO_2^{-1} + 2 OH^{-1} \quad -0.01 V \quad (1\text{-}50)$$

The overall reaction for this system indicates that nitrate ions will oxidize hydrogen peroxide to yield oxygen and nitrite ions. However, the nitrite ion is only partially dissociated and it exists as undissociated nitrous acid. The degree of dissociation of nitrous acid can be expressed as x, the fraction dissociated, and (1−x), the fraction undissociated, see reaction 1-5 1.

$$H_2O_{2(l)} + NO_3^- \quad xNO_2^{-1} + (1\text{-}x) HNO_{2(l)} + O_{2(l)} + (1\text{-}x) OH^{-1} + xH_2O \text{-}0.086 V \quad (1\text{-}51)$$

The reaction is first order at low hydrogen peroxide concentrations and independent of the peroxide concentration at high concentrations[36].

Reaction Mechanisms. Reaction mechanisms for the oxidation of nitrite ions with hydrogen peroxide in acidic and alkaline solutions are given below. The reactions are separated into the phases where the reactions are thought to occur. Finally, an estimate for the reaction rate for the oxidation of nitrous acid with hydrogen peroxide is presented.

Liquid Phase $$HNO_2 + H^{+1} \rightleftharpoons + NO^{+1} + H_2O \quad (1\text{-}52)$$

$$H_2O_2 + NO^{+1} \quad HOONO + H^{+1} \quad (1\text{-}53)$$

$$HOONO + H^{+1} \quad 2 H^{+1} + NO_3^{-1} \quad (1\text{-}54)$$

Gas Film-Liquid Film Interface $$N_2O_4 + H_2O_2 \quad 2 HNO_3 \quad (1\text{-}55)$$

$$2 NO_2 + H_2O_2 \quad 2 HNO_3 \quad (1\text{-}56)$$

$$NO + NO_2 + 2 H_2O_2 \quad 2 HNO_3 + H_2O \quad (1\text{-}57)$$

$$N_2O_3 + 2 H_2O_2 \quad 2 HNO_3 + H_2O \quad (1\text{-}58)$$

The final reaction for the scrubber liquor would be the neutralization of the nitric acid formed in the reactions of water and hydrogen peroxide with potassium hydroxide. The product of this reaction, which take place in the liquid phase would be potassium nitrate.

Liquid Phase $$HNO_3 + KOH \quad KNO_3 + H_2O \quad (1\text{-}59)$$

The final product, potassium nitrate, would be a desired material which has commercial value as a fertilizer. Other products could be produced depending upon the oxidizer used for the nitrite ions and/or NO and the base used to neutralization the nitric acid.

The rate of the oxidation of nitrous acid with hydrogen peroxide can be expressed as follows[36]:

$$-\frac{d[H_2O_2]}{dt} = \frac{k_1[H^+][HNO_2][H_2O_2]}{1+k_2[H_2O_2]} \quad (1\text{-}60)$$

The intermediate, HOONO, is unstable in acid solution and reacts to produce nitric acid.

It is possible to oxidize sodium nitrite ($NaNO_2$) and nitric oxide (NO) with ozone or hydrogen peroxide to $NaNO_3$ and $NO_2$.[39,40] $NaNO_2$ undergoes reactions that lead to the generation of NO, which is volatile and must be removed; however, the reaction rate improves at lower pH. Oxidation of NO with ozone is one of the major oxidation routes to $NO_2$, which occurs in the atmosphere[39]. Also, ozone oxidation of NO is the basis for operation of the chemiluminesent detector[40]. Hydrogen peroxide can be used to oxidize NO to $NO_2$ or $NO_2^{-1}$ to $NO_3^{-1}$, which is useful in a scrubber[41] or analytical methods[42].

KSC Oxidizer Scrubbers

There are eight oxidizer scrubbers at KSC located at Pads 39 A and B, the OPF, and the HMF. These scrubbers are constructed of 300 series stainless steel and the scrubber pumps use Teflon seals. Each scrubber has four towers that are approximately 30 inches in diameter and 72 inches high, a 1000-gallon scrubber liquor storage tank, a liquid separator, and a 200-gallon-per-minute (gal/min) pump that feeds a distribution manifold to provide a 50-gal/min flow down each tower. The volume of scrubber liquor in the storage tanks is typically in the range from 600 to 700 gallons.

Currently, the KSC oxidizer scrubbers react nitrogen tetroxide and/or nitrogen dioxide with nominally 25-weight-percent sodium hydroxide, which produces sodium nitrate, sodium nitrite, and nitric oxide. Nitrogen dioxide is in equilibrium with nitrogen tetroxide in the gas phase, reaction 1-61. Nitric oxide is not a primary gas-phase reactant, but it is produced during the liquid-phase reactions 1-65 and 1-66. Once produced, nitric oxide can either combine with nitrogen dioxide, reaction 1-62, or be oxidized by oxygen in the scrubber to nitrogen dioxide, reaction 1-63, to be reabsorbed in the scrubber liquor, reactions 1-64 to 1-67. However, the nitric oxide can escape reaction with the scrubber liquor be released into the atmosphere.

Gas Phase Reactions $$N_2O_4 \rightleftarrows 2\, NO_2 \quad (1\text{-}61)$$

$$NO_2 + NO \rightleftarrows N_2O_3 \quad (1\text{-}62)$$

$$2\, NO + O_2 \quad 2\, NO_2 \quad (1\text{-}63)$$

Liquid Phase Reactions $$N_2O_4 + 2\, NaOH \quad NaNO_2 + NaNO_3 + H_2O \quad (1\text{-}64)$$

$$NO_2 + 2\, NaNO_2 \quad NaNO_3 + NO \quad (1\text{-}65)$$

$$3\, NO_2 + 2\, NaOH \quad 2\, NaNO_3 + NO + H_2O \quad (1\text{-}66)$$

$$N_2O_3 + 2\, NaOH \quad 2\, NaNO_2 + H_2O \quad (1\text{-}67)$$

As illustrated above, the presence of nitrite ions leads to the generation of NO, which is emitted from the spent scrubber solution. The NO generated by the scrubber solution will oxidize to $NO_2$ in air, which produces an environmental hazard. Therefore, all of the nitrite ions must be oxidized to nitrate to remove potential hazards. It has been previously demonstrated that it is possible to oxidize nitrite ions to nitrate ions with hydrogen peroxide or ozone. The spent caustic scrubber liquor could be used as a fertilizer, if potassium hydroxide was substituted for sodium hydroxide, the pH was adjusted with nitric acid, and the nitrite ion was oxidized to the nitrate ion with hydrogen peroxide.

The $NO_x$ emissions from the oxidizer scrubbers have been the subject of several investigations at KSC[56-59]. These investigations have examined the packing materials, scrubber liquor, operating conditions, and addition of various gases in an effort to improve the performance of the oxidizer scrubbers. In one study[56], a falling film evaporator was used to generate a constant flow rate of $NO_2$ to the scrubber, which produced inlet concentrations from 3,200 to over 200,000 parts per million (ppm). The packing material used in this study was ceramic saddles. The flow rates of gaseous nitrogen ($GN_2$) vented through the scrubber ranged from 0 to 700 standard cubic feet per minute (scfm). As the $GN_2$ flow rate increased, the efficiency decreased; for example, at 150 scfm the efficiency was approximately 90 percent and at 300 scfm the efficiency fell to 60 percent. In addition, when oxygen was added to the $GN_2$, the efficiency for removal of NO increased.

A second series of tests at KSC[57] used "Flexiring" and "Sulzer" packing (manufactured by Koch Engineering Company) instead of ceramic saddles, and showed little change in the efficiency of the scrubbers. One interesting observation was the decrease in the efficiency as the inlet concentration decreased for the same GN2 flow rate; for example, at 50 scfm with an inlet concentration of 60,000 ppm, the efficiency was 98 percent and, with an inlet concentration of 500 ppm, the efficiency was 60 percent.

A change of the scrubber liquor from 25-weight-percent sodium hydroxide to 11.6-weight-percent sodium sulfite and 5-weight-percent sodium hydroxide in towers 3 and 4 of the scrubbers was recommended because of the increased efficiency[58,59]. For example, at 400-scfm and 8,400-ppm inlet concentration, the efficiency for 25-weight-percent sodium hydroxide was 55 percent but with 11.6-weight-percent sodium sulfite and 5-weight-percent sodium hydroxide, the efficiency was 98 percent. However, the change from 25-weight-percent sodium hydroxide to 11.6-weight-percent sodium sulfite and 5-weight-percent sodium hydroxide was not made due to safety considerations.

The addition of ozone to the $GN_2$ stream has been examined on the laboratory scale and a significant increase in the scrubber efficiency was found[60]. For example, when the inlet concentration was 25,800 ppm, the efficiency was 95.8 percent without ozone; and when the inlet concentration was 23,100 ppm, the efficiency was 99.6 percent with ozone.

A conceptual study for the conversion of the alkaline scrubber liquor waste from nitrogen tetroxide used in launch-vehicle rockets at Vandenberg AFB, Cape Canaveral AFS, and KSC to fertilizer has been reported[64]. This study proposed to use nitric acid to neutralize the excess sodium hydroxide in the scrubber liquor and ozone to oxidize the nitrite ions to nitrate ions. Their proposed process would produce sodium nitrate with a nitrite ion concentration of 0.01 molar at a pH of 7.

Review of Analytical Methods

Two analytical problems need to be addressed before the laboratory studies in order to develop a new scrubber liquor for the oxidizer. It is important to measure the concentration of nitrate and nitrite ions captured by the scrubber liquors to calculate the efficiency of the scrubber with different scrubber liquors. Also, the concentration changes of hydrogen peroxide, pH, nitrate, and nitrite ions in the scrubber liquor are important. Measurement of the total nitrate/nitrite concentration for the vapor samples can be accomplished by a number of methods which are reviewed in the next section. However, measurement of the concentration changes in the scrubber liquors is more difficult because of the interferences from mixtures of hydrogen peroxide, nitrate ions, and nitrite ions. Procedures which address these issues are given below.

NITRATE AND NITRITE ANALYSIS. Analysis of nitrate and nitrite ions has been a concern for over 100 years and many of the analytical procedures developed during those early investigations are still in use today. The analytical methods can be divided into colorimetric methods, which detect colored reactions products; titrimetric methods, which use acid/base or oxidation/reduction reactions to measure the quantity of nitrate and/or nitrite present; gravimetric methods, which measure the nitrogen reaction product; nitrometry, which measures NO gas formed; and ion chromatography, which measures conductivity, electrochemical, or ultraviolet absorption.

Colorimetric Methods. Colorimetric methods include formation of azo dyes, nitration of phenols, and salt formation. Many of these methods were developed in the late 1800's, but are still in use today. Details of the methods considered for nitrogen tetroxide analysis of scrubber efficiencies for the various scrubber liquors examined by this study are given below:

1-Hydroxy-2,4-benzenedisulfonic acid (phenoldisulfonic acid). The method used previously[1] to monitor the emissions from the hypergolic-propellant oxidizer scrubbers at KSC was as based on the nitration of phenoldisulfonic acid. This method for analysis of nitrate ions has been the subject of many investigations[65-68] and is the basis for ASTM method D 1608-77[69]. The absorption of ammonium 6-nitro-1-hydroxy-2,4-benzenedisulfonate is measured at 405 nanometer (nm), and the method has a useful range from 5 to 2000 ppm. Analytical samples can be diluted to allow measurement over the range from 5 ppm to saturated nitrogen tetroxide vapor. Reducing agents, such as nitrites or organic nitrates can consume the hydrogen peroxide in the absorbing solution and give erroneously high readings. However, nitrites can be converted to nitrates to give a measure of the total $NO_x$ in the sample. The standard error for the method at the 95-percent confidence level is −3.6 to −7.7 percent of the true value.

3,4-Xylenol. This method is similar to the phenoldisulfonic acid procedure where the xylenol is nitrated to produce a colored compound. Holler[70] examined the six xylenol isomers and found that 3,4-xylenol was the best reagent. The 3,4-xylenol is easily nitrated to yield 2- or 6-nitro- products which are steam-distillable. Barnes[71] used 2,4-xylenol to improve the analytical method by substituting a toluene extraction for steam distillation, which had been used previously. The only interferences that would affect this study are nitrites and hydrogen peroxide. However, the nitrites are converted to the nitrates with hydrogen peroxide to provide a measure of the total nitrogen tetroxide absorbed. Hydrogen peroxide is removed with 0.5-percent potassium permanganate, and the nitrite ion can be removed at the start of the analysis by heating the sample acidified with acetic acid followed by the addition of 20-percent sulfamic acid. The method is useful for the concentration range of 0.1 to 0.35-milligram (mg) nitrate nitrogen in 100 milliliters (mL).

Strychnine. Nitrates react with strychnine to form highly colored nitrate salts in the presence of sulfuric acid[71,72]. The method is sensitive to 0.01-ppm nitrate nitrogen. Nitrites and oxidizing agents interfere with the method.

Brucine hydrochloride. Fisher[73] reports that a 2-percent solution of brucine hydrochloride forms colored salts with nitrates and nitrites. The concentration of sulfuric acid can be adjusted to differentiate between the nitrite and nitrate plus nitrite. Measurements are made at 410 nm, with the temperature controlled below 70 degrees Celsius (° C.) to prevent loss of nitrite color. The method is able to detect concentrations of nitrate or nitrite as low as 0.2 ppm and has a precision of +2 percent at 15 ppm.

Azo dyes. There have been many examples[74-86] where the nitrite ion concentration is determined by measuring the concentration of azo dyes formed when the diazonium salt is coupled with an aromatic amine. Nitrite ions in strong acid solutions will form diazonium salts with primary aromatic amines when the temperature is kept low. Thus the concentration of the diazonium salt is directly proportional to the concentration of the nitrite salt in the original sample. The diazonium salt is then coupled with an aromatic amine or other compound to form an azo dye which is highly colored. The concentration of the resulting azo dye is usually determined from a calibration curve developed on a suitable colorimeter.

The diazotization of sulfanilic acid by Griess[74] and Rider[75] followed by coupling with 1-aminonaphthalene represents the classical method for analysis of nitrite ions. This azo dye can be used to determine concentrations of nitrite as low as 0.0005 ppm with 24-centimeter (cm) Nessler tubes. The reddish purple color is measured at 520 nm. There is little interference from ions, such as $Mn^{+2}$, $Ni^{+2}$, $SO_4^{-2}$, or $Cl^-$. However, strong oxidizing or reducing agents cause interference and must be absent. Usovay[76] modified this procedure and used 1-amino-7-naphthalenesulfonic acid to couple with diazotized sulfanilic acid. Also, 1-aminonaphthalene was determined to be a suspect carcinogen, which is an additional reason to change to 1-amino-7-naphthalenesulfonic acid.

Robinson,[77] Saltzman,[78] and KSC TVDL SOP-4.4[79] made -additional modifications to the Griess procedure and used N-(1-naphthyl)-ethylenediamine dihydrochloride with diazotized sulfanilic acid to form an azo dye that absorbed at 550 nm. The dye was stable and had a sensitivity to nitrogen dioxide of a few parts-per-billion (ppb) for a 4-L sample captured in a midget impinger with 10 mL of scrubber solution. Also, Saltzman[78] found that it was possible to add the diazotization and coupling agents to the impinger at the same time, which gave direct color generation. This procedure improved the absorption efficiency; however, it decreased the effective range of the system[1]. In addition, Saltzman changed the diazotizing agent from sulfanilic acid to sulfanilamide and used 1-aminonaphthalene with sulfanilic acid. He concluded that the best combination of reagents, concentrations, and method was the direct color method with an absorbing solution that contained 0.5-percent sulfanilic acid, 0.002-percent N-(1-naphthyl)-ethylenediamine dihydrochloride, and 14-percent acetic acid. The initial calibration curve was generated by assuming that 0.5 moles of nitrite was formed or reacted with the absorbing solution for each mole of nitrogen dioxide gas scrubbed. However, this assumption was incorrect and the correct value should be 0.51 moles. Saltzman examined the effects of ozone, nitric acid, hydrogen peroxide, and many other interfering agents. Ozone at a fivefold excess did not interfere with the method, nitric acid added to the scrubbing solution had no effect, and hydrogen peroxide increased the color only 4 percent in 2 hours.

Several investigators[80-86] have used sulfanilamide and N-(1-naphthyl)-ethylenediamine to form an azo dye for the analysis of nitrite ions. The procedure developed by Bendschneider[67] used a 1-percent solution of sulfanilamide dissolved in 1.2-normal (N) hydrochloric acid to form the diazonium salt with the nitrite ions. Then the diazonium salt was reacted with a 0.1-percent solution of N-(1-naphthyl)-1-ethylenediamine dihydrochloride to from the azo dye, which was analyzed at 543 nm with a spectrophotometer. Bendschneider found that the optical density was unaffected by an increase in salinity to 34.3 percent if the reagents were added separately, while there was an increase in the optical density with an increase of salinity when the reagents were premixed. Nydahl[81] examined the conversion of nitrate ions to nitrite ions with cadmium metal and cadmium metal treated with. copper sulfate as a means for determination of the total nitrate/nitrite concentration. The nitrate ions, once converted to nitrite ions, were analyzed with the sulfanilamide/N-(1-naphthyl)-1-ethylenediamine system. Since nitrite ions can be reduced, it is important to optimize the reduction of the nitrate ions and prevent reduction of the nitrite ions. Nydahl found that best results were obtained when cadmium metal was used at a pH of 9.5, which gave a yield of 99.9+0.1 percent. However, the ASTM D 3867-85[82] method uses cadmium treated with copper sulfate in the pH range from 6 to 8 and reports that the results were fair. Johnson, et. al.[83] used flow-injection-analysis techniques to measure low levels of nitrate in sea water. They reduced the nitrate ions to nitrite ions with a copper sulfate doped cadmium powder operated at a pH of 6.60 and report that the reduction was 100 percent. The nitrite ion concentration was measured with the sulfanilamide/N-(1-naphthyl)-1-ethylenediamine method. They report an error of +0.1-percent transmitance measurement. An alternate method for reduction of nitrate ions to nitrite ions is described in Standard Methods[84] where hydrazine sulfate is used as the reducing agent. Shooter[52] used triethanol amine to capture nitrogen dioxide from atmosphere, which forms nitrosodiethanolamine. Also, nitrosodiethanolamine is the product when nitrite ions react with triethanol amine. Since nitrosoamines are easily hydrolyzed to form nitrites with phosphoric acid, then all of the nitrogen dioxide is converted to nitrite ions and no nitrate is formed. Therefore, this method provides a direct measurement of nitrogen dioxide. The nitrite ions, once formed from hydrolysis of nitrosodiethanolamine, are analyzed by the sulfanilamide/N-(1-naphthyl)-1-ethylenediamine method.

The current procedure for analysis of nitrite in water suggested in Standard Methods[85] is based on direct color generation by phosphoric acid, sulfanilamide, and N-(1-naphthyl)-1-ethylenediamine. This procedure is sensitive to nitrogen trichloride, $Pb^{+3}$, $Fe^{+3}$, and colored ions. The useful detection range is 5 to 50 micrograms per liter ($\mu$gm/L) with a sensitivity of ±2-percent. Ormaza-Gonzalez[86] studied the difference between the results obtained from test kits and laboratory instruments for analysis of nitrites and nitrates based on the sulfanilamide/N-(1-naphthyl)-1-ethylenediamine method. He found that detection limits, blanks, and absorption coefficients were significantly improved when the standard laboratory instruments were used.

Nessler's reagent. Nitrites and nitrates are reduced to ammonia with ferrous sulfate and the resulting ammonia is analyzed at 400 to 425 nm after reaction with Nessler's reagent. The method is useful over the range from 20 $\mu$g/L to 10 milligrams per liter (mg/L)[87].

Ferrous Sulfate. Ferrous sulfate has been used for many years as a reagent for the qualitative identification of nitrate ion by the "brown ring" test. However, at high acid concentrations a red-purple color is produced, which Swann[88] has used as to quantitatively measure the nitrate concentration. The method is based on the formation of $Fe(NO)SO_4$ from the reaction of ferrous sulfate with nitric oxide (NO). The concentration is determined by comparison with a standard calibration curve produced by the absorption at 525 nm. Nitrites and thiosulfates cause interference, but sulfates, phosphates, sulfites, chlorates and halogens do not interfere with the analysis.

Diphenylamine. Coldwell[89] found that nitrate ions react with diphenylamine when irradiated with ultraviolet light to produce a product that absorbs at 397 nm. The method was able to detect 0.01 microgram per milliliter ($\mu$g/mL) of nitrate ion and was not affected by the presence of peroxide, nitrite, chloride, hydroxide, sulfate, or iodide ions. The procedure dries the initial sample, which removes the peroxide interference before the diphenylamine reagent is added.

Ion Chromatozraiphv Methods. Nitrate and nitrite ions can be analyzed by ion chromatography with either an ultraviolet or a conductivity detector. The minimum detectable concentrations for nitrate and nitrite ions is 10 nanograms per milliliter (ng/mL). The column and operating conditions depend upon the detector and instrument[78].

Titrimetric Methods. There are a number of titrimetric methods that can be used to measure the concentration of nitrate or nitrite ions[91,92]. These methods are useful from 0.01 percent to saturation for either nitrate or nitrite. These methods generally reduce the nitrate or nitrite ions to ammonia, which is analyzed by acid/base titration or redox titration.

Fourier Transform Infrared (FTIR) Methods. Since the scrubber liquors contain mixtures of nitrite and nitrate ions along with hydrogen peroxide, it is important to select analytical methods that will not cause changes in the oxidation state of the sample. One analytical method that can measure the concentration of the components without changing the sample is infrared. Nitrite and nitrate ions and hydrogen peroxide absorb in different regions of the infrared. Recently, a new method of calibrating an FTIR for multiple component analysis was developed by Mattson and Schwindt[93] which improved the analytical capabilities of the method. This new method combines classical least square fitting of the spectrum with a second order baseline correction to provide a robust analytical tool that is insensitive to changes in absorbance baseline due to unstable conditions. It is this new approach to calibration of FTIR spectra for nitrate and nitrite ions and hydrogen peroxide that was applied to the analysis of the scrubber liquors. This new method[93] is based on an algorithm that uses shape vectors for absorbance baseline correction to compensate for the variable thermal environment found in the field. The Beers Law P-matrix expression for multiple component analysis is solved by classical least square methods. The unknown concentrations can be calculated by the expression, C=PA, where C is the set of unknown concentrations to be measured, P is a matrix which performs the transformation, and A is a set of absorbent values measured at selected spectral positions. The P matrix, given in equation 1, can be determined by solving the matrix using matrix manipulations.

$$P = CA^T[AA^T]^{-1} \qquad (1)$$

However, equation 1 can only be solved for [n, spectrum points]<=[m, spectra] so that $[AA^T]$ will have an inverse, which limits spectral information. Therefore, an alternate approach was used which avoids the problems associated with equation 1. This alternate approach is based on coefficients that fit the shape of the unknown spectra to the shapes of the calibration spectra. The expression, given in equation 2, gives results identical with equation 1.

$$P=C[A^T A]^{-1} A^T \quad (2)$$

Equation 2 gives good numerical results in Pascal Real precision if $Det[A^T A] > \sim 10^{-7}$. The base-line compensation function is arbitrary, but second order polynomials usually give a good fit. The calibration spectra are used to scale the data to produce quantitative measurements.

The calibration process involves two steps. First, spectra of the target materials are generated at about 1 absorbance unit. A high-quality, low-noise spectrum is produced for each material. Each spectrum is normalized to 1.0 absorbance units for the highest peak in the region of interest. The set of spectra are processed through the calibration program to produce an array of weight factors for simultaneous multicomponent analysis of the sample. The second step is to prepare standards of known concentration, measure them using a scale factor of 1.0, and then the ratio of the standard to the measurement is calculated (mean and sigma). This ratio then becomes the calibration scale factor for the unknown sample.

HYDROGEN PEROXIDE ANALYSIS. Methods of hydrogen peroxide analysis were reviewed to determine the best method to analyze the scrubber liquor, which would contain hydrogen peroxide along with nitrate and possibly nitrite ions. In general, hydrogen peroxide reactions are those of a strong oxidizing agent. For example, the calorimetric reaction of the ferric ion with thiocyanate is commonly used to monitor the oxidation of the ferrous ion. Therefore, oxidation of ferrous ions can be used to measure the amount of hydrogen peroxide. Because these reactions depend upon the oxidizing characteristics of hydrogen peroxide, the presence of other oxidizing agents like nitrate ions can interfere with the analysis. There are many analytical methods for analysis of hydrogen peroxide that are based upon colorimetric or chemiluminesent reactions, which may not be affected by the presence of nitrate or nitrite ions. One major application of trace hydrogen peroxide analysis by colorimetric or chemiluminesent methods has been in the biomedical field, where enzymically produced hydrogen peroxide has been extensively studied. Examples of some reactions that may be useful for the scrubber liquor assay are reviewed below.

Titrimetric Methods. The analysis of hydrogen peroxide is typically accomplished by titrating with potassium permanganate in acid solutions or iodometric titration (back titrate an excess of potassium iodide with sodium thiosulfate). Many examples of analytical methods based on these techniques may be found in the chemical literature. Typical methods are summarized below.

Potassium Permanganate. Typical concentrations of potassium permanganate used to titrate hydrogen peroxide vary from 0.01 to 0.5 N. Since it is necessary to remove traces of reducing substances, standard solutions are prepared by boiling the solutions. Once the desired concentration is selected, then the potassium permanganate solution is prepared, boiled, filtered, and standardized with sodium oxalate or other standard substances. The hydrogen peroxide sample is added to approximately 100 mL of water that contains 10 mL of 1:4 (vol/vol) sulfuric acid. Sufficient hydrogen peroxide sample is used to require approximately 10 to 20 mL of standardized potassium permanganate to produced a pink color that will last for 30 seconds.

Nitrite ions do not react with neutral or alkaline potassium permanganate; however, when acidified potassium permanganate will oxidize nitrite ions to nitrate ions. Therefore, when nitrite ions are present in the sample, titration of hydrogen peroxide with potassium permanganate in acid solutions would also produce nitrate ions. However, if the hydrogen peroxide in the scrubber liquor oxidized all the nitrites to nitrates, then any excess hydrogen peroxide could be measured by titration with acid potassium permanganate.

Potassium permanganate titration to a potentiometric end point can be used for ppm levels of hydrogen peroxide. However, this potentiometric method can not be used in the presence of reducible impurities.

Potassium Iodide-Sodium Thiosulfate. This potassium iodide-sodium thiosulfate titration of hydrogen peroxide can be used in the presence of oxidizable organic materials. Typically, 0.1-N sodium thiosulfate is used to back titrate iodine produced by the oxidation of potassium iodide by the hydrogen peroxide sample. The hydrogen peroxide sample is added to approximately 100 mL of water that contains 10 mL of a 1:4 (volume/volume) sulfuric acid solution. Next, 10 mL of 20-weight-percent potassium iodide, and 3 to 5 drops of ammonium molydate are added to the hydrogen peroxide sample. The resulting solution is titrated with 0.1-N sodium thiosulfate to a straw yellow color, then 5 to 10 mL of starch indicator solution is added and the titration is continued to a clear end point.

Cerric Sulfate. Cerric sulfate can be used to titrate hydrogen peroxide samples potentiometrically with a platinum/reference electrode or from an orange-to-blue color change with ferrous orthophenanthroline. The cerric sulfate titration is reported to be more accurate than potassium permanganate when oxidizable materials are present.

Colorimetric Methods. A number of colorimetric methods exist for the analysis of hydrogen peroxide and many of these methods have very low limits of detection. For example, it is possible to determine the concentration of hydrogen peroxide in aqueous solutions by reacting it with a reagent that contains sodium hydroxide, peroxidase, phenol, Triton X-100, nitro tetrazonium blue, and pH 7.0 Tris-HCl buffer at 37° C. for 10 minutes. The absorbance of the solution is measured at 560 nm for the determination of hydrogen peroxide[94]. 4-aminoantipyrine reacts with hydrogen peroxide to from a colored complex, which is determined calorimetrically. Micromolar quantities of hydrogen peroxide have been determined calorimetrically by following the blue starch-iodine complex from the oxidation of iodide ions in the presence of ammonium molybodate[96]. Oxidation of the ferrous ion with hydrogen peroxide in acid solution in the presence of thiocyanate ions produces ferric thiocyanate, which is red. This method initially. reported by Horst[97] and later by Reichert[98] is sensitive to 1-ppm hydrogen peroxide when a large excess of thiocyanate ions are present. Alternately, the oxidation of the ferrous ion by hydrogen peroxide can be detected by a method reported by Laitinen[99], which used the complex formed by ferric phenanthrolinate. The ferric phenanthrolinate method is sensitive to ppm of hydrogen peroxide and the color produced is stable for months. Also, the titanium (IV) ion can be oxidized by reaction with hydrogen peroxide in an acid solution to titanium (VI), which is colored yellow. This reaction which is based on the formation of pertitanic acid has been used to determine hydrogen peroxide at the ppm levels for many years[98,99,101]. A variation on this pertitanic acid method was reported by Rynasiewicz[102] who used ion exchange resins to remove interferences from chromate ions. This approach has the potential to remove the interferences from nitrate and nitrite ions when hydrogen peroxide is present.

Chemiluminescent Methods. Chemiluminescence methods for the analysis of hydrogen peroxide are extremely sensitive and have limits of detection in the parts-per-trillion (ppt) range. Several compounds are known to emit light when reacted with hydrogen peroxide; for example, luminol[103-111], fluorescein[112-114], peroxyoxalate[115-117], 1,1'-oxalyldiimidazole[118], coumarin[119], pyridazinoquinoxalinones[120], and 5-hydroxy-2,3-dihydrophthalazine-1,4-dione[121]. Many of the applications of cheriluminescence for hydrogen peroxide analysis are in the biomedical field, where very low levels (picomoles) are measured. Since the concentrations of interest for this project were in the 0.1-percent range, the only interest in chemiluminescence was to find a method that could be used in the presence of nitrite and nitrate ions. No chemiluminescent method was found that could be used for hydrogen peroxide analysis without removal of nitrate and nitrite ion interferences.

Electrochemiluminescence[122] is another variation on the chemiluminescent technique, which is effective for continuous analysis. This technique uses continuous mixing of the luminol and hydrogen peroxide solutions in a separate process from the reaction process, which eliminates problems found in conventional chemiluminescence. The flow cell was constructed from electroconductive glass which served as an anode for the reaction. A good linear relationship was obtained between the hydrogen peroxide concentration and the electrochemiluminescent intensity.

ANALYTICAL METHOD DEVELOPMENT

The analytical methods described in this section were required to analyze the used scrubber liquor, the hydrogen peroxide concentration in the test scrubber liquors before use, and the gas-phase emissions from an oxidizer scrubber for this study. Initially, the gas-phase analytical method for $NO_x$ used ASTM method D 1608-77[56], which had previously been used to develop a new procedure for monitoring the emissions from the oxidizer scrubbers at KSC[1]. Although this method is useful over the range from 5 to 2000 ppm with a standard error at the 95-percent confidence level of −3.6 to 7.7 percent of the true value, the procedure is very slow and labor intensive. Therefore, a new method, based on ion chromatography, was developed. Analysis of the scrubber liquor was complicated by the presence of two oxidizing agents, nitrate ions and hydrogen peroxide, and nitrite ions, which meant that analytical methods which responded to oxidation/reduction characteristics of the analyte could not be used. Analysis of the scrubber liquor was important, first, to study changes that occurred due to different scrubber liquors and, second, for the development of a process control system.

NITRATE AND NITRITE ANALYSIS. Several of the analytical methods described in 1.5.1 were considered, but were rejected because they lacked the needed sensitivity, they were difficult to use, or they had interference from other ions. The initial colorimetric methods selected were based on N-(1-naphthyl)-ethylenediamine and 1-hydroxy-2,4-benzenedisulfonic acid. However, the 1-hydroxy-2,4-benzenedisulfonic acid colorimetric method was replaced after the initial tests by an ion chromatographic method.

COLORIMETRIC METHODS. The colorimetric method used for the initial tests was based on N-(1-naphthyl)-ethylenediamine[66,74], the method used in Toxic Vapor Detection/Contamination Monitoring Laboratory (TVD/CML) standard operating procedure (SOP)-4.4. This SOP is used by the Toxic Vapor Detection Laboratory (TVDL) to calibrate the KIN-TEK $NO_2$ vapor generating system and was selected to monitor and calibrate the $NO_2$ sample system used in this study. The sample generation system produced a mixture of $NO_2$ and $N_2$ with no other $NO_x$ compounds present that would interfere with the method. SOP-4.4 uses an absorbing solution that contains 0.5-weight-percent sulfanilic acid and 0.002-weight-percent N-(1-naphthyl)-ethylenediamine dihydrochloride in 14-weight-percent acetic acid. The reaction of $NO_2$ with the absorbing solution forms nitrous acid, which is converted to a diazonium salt with sulfanilic acid. The diazonium salt is coupled with the N-(1-naphthyl)-ethylenediamine to produce an azo dye, which absorbs at 550 nm. However, some of the $NO_2$ reacts directly with sulfanilic acid so 0.5 1-mol percent of the $NO_2$ is used to from the azo dye. The color development requires approximately 15 minutes and the color produced is stable for over 1 hour.

Since NO is a product of the scrubbing reactions and there are no provisions to oxidize it to nitrate, it was not possible to effectively use the SOP-4.4 procedure to monitor the efficiency of the scrubber liquors. Therefore, an alternate method, ASTM D1608-77, was used to measure the $NO_X$ present in the gas stream after the scrubber. ASTM method D 1608-77 is a colorimetric method that measures the concentration of ammonium 6-nitro-1-hydroxy-2,4-benzenedisulfonate produced by nitration of 1-hydroxy-2,4-benzenedisulfonic acid. The source of the nitrating agent is $NO_X$ species captured by an acidic impinger solution, which are oxidized to nitrate ions with hydrogen peroxide. Therefore, any $NO_X$ products that are soluble in the impinger solution would be converted to the nitrate ion and measured. The difficulty with the procedure is that it requires that the impinger solution, after addition of hydrogen peroxide, be evaporated to dryness. This step is time consuming and has the potential for sample loss. This procedure was used for the initial tests (runs 1 to 9), but was replaced with the ion chromatograph (IC) method.

ION CHROMATOGRAPHIC METHODS. The IC methods were based on standard anion techniques and used a HP DX 500 IC system that operated under their PeakNet™ Chromatography Workstation software. The DX 500 system consists of a GP40 gradient pump, ED40 electrochemical detector, AS40 automated sampler, and is housed in a LC20 enclosure. The Dionix™ system used an AS4 column for the anion analysis. The autosampler used 5-mL filter sample tubes and injected 0.100-mL samples into the IC. A series of 4 to 6 nitrite and nitrate ion standards as $NO_2$ were prepared with concentrations of 100 to 5000 ng/mL.

A major problem encountered when working in this concentration range is the difficulty of removing residual nitrate or nitrite ions from the surfaces of the glassware used for the analysis. The glassware was cleaned with soap and water, rinsed with 20-percent nitric acid, rinsed 3 times with tap water, followed by 10 rinses with deionized (DI) water. Only by following these procedures could we remove the residual traces of nitrate or nitrite ions from the surfaces of the glassware. Validation of clean glassware was based on confirming that the DI water used in the test was free of nitrate and nitrite ions by injecting a sample in the ion chromatograph, then rinsing the surface with 10 to 20 mL of clean DI water and injecting the rinseate into IC and checking for nitrite or nitrate ions. Checks for cross-contamination between samples with the autosampler were made by injecting a concentrated nitrate and nitrite standard (5000 ng/mL) followed by DI water. No detectable nitrite or nitrate ions were found in the DI water samples, which indicated that there was no cross-contamination between IC samples due to the autosampler.

The standard operating procedure adapted after the initial IC (runs 10 through 54) measurements was to include a calibration standard between every five samples. Data between standards were rejected if the standard deviated by more than 5 percent of the standard value. This procedure assured that the calibration data remained valid.

The analytical method development for gas-phase $NO_x$ analysis focused on the selection of the impinger solution. Several tests were performed to determine the best impinger solution to capture the gaseous $NO_x$ samples for IC analysis. The results of these tests are summarized in table 2-1. All concentrations of nitrite or nitrate ions given in table 2-1 are expressed as ng of $NO_2$. Two approaches were taken to select this solution: (1) $NO_2$ samples from the sample generator were captured with a syringe and injected into the impinger solutions and (2) samples of nitrate and nitrite ions of known concentration were added to the impinger solutions. There was some difficulty collecting reproducible vapor samples with the gastight syringe; therefore, this procedure was changed. The IC calibration was changed during the course of the tests when known concentrations of nitrite and nitrate ions were added. These changes were made for the last seven runs shown in table 2-1. It was desirable to collect the samples for IC analysis as the nitrate ion since the water dip, which occurs at low concentrations, interferes with the baseline which had to be checked for each sample.

TABLE 2-1

Characteristics of $NO_x$ Impinger Solutions for IC Analysis

| Impinger Solution | Sample | Results as ng $NO_2$ | |
| --- | --- | --- | --- |
| | | Nitrite Ion | Nitrate Ion |
| 0.3% $H_2O_2$, 0.001M $H_2SO_4$ | 10 mL $NO_2$, 400 ppm | 0 | 237 |
| 0.3% $H_2O_2$, 0.001M $H_2SO_4$ | 5 mL $NO_2$, 500 ppm | 0 | 159 |
| 0.3% $H_2O_2$, 0.001M $H_2SO_4$ | 5 mL $NO_2$, 340 ppm | 0 | 96 |
| 0.3% $H_2O_2$ | 0 ppm | 0 | 0 |
| 0.001M $H_2SO_4$ | 0 ppm | 0 | 0 |
| 0.001M $H_2SO_4$ | 5 mL $NO_2$, 350 ppm | 73 | 70 |
| 0.001M $H_2SO_4$ | 5 mL $NO_2$, 350 ppm | 66 | 63 |
| 0.001M KOH, 0.1% $H_2O_2$ | 0 ppm | 0 | 0 |
| 0.001M KOH, 0.1% $H_2O_2$ | 5 mL $NO_2$, 300 ppm | 168 | — |
| 0.001M KOH, 0.1% $H_2O_2$ | 5 mL $NO_2$, 250 ppm | 123 | 15 |
| 0.001M KOH, 0.1% $H_2O_2$ | 5 mL $NO_2$, 300 ppm | 195 | 17 |
| 0.1% $H_2O_2$, 0.001M $H_2SO_4$ | 0 ppm | 0 | 0 |
| 0.1% $H_2O_2$, 0.001M $H_2SO_4$ | 5 mL $NO_2$, 300 ppm | 0 | 129 |
| 0.1% $H_2O_2$, 0.001M $H_2SO_4$ | 5 mL $NO_2$, 250 ppm | 0 | 59 |
| 0.1% $H_2O_2$, 0.001M $H_2SO_4$ | 5 mL $NO_2$, 250 ppm | 0 | 111 |
| 0.1% $H_2O_2$, 0.001M $H_2SO_4$ | 50 ng $NO_2^{-1}$ | 0 | 33 |
| 0.001M KOH, 0.1% $H_2O_2$ | 50 ng $NO_2^{-1}$ | 41 | 0 |
| 0.1% $H_2O_2$, 0.001M $H_2SO_4$ | 50 ng $NO_3^{-1}$ | 0 | 36 |
| 0.001M KOH, 0.1% $H_2O_2$ | 50 ng $NO_3^{-1}$ | 0 | 41 |
| 0.001M KOH, 0.1% $H_2O_2$ | 50 ng $NO_2^{-1}$ + 50 ng $NO_3^{-1}$ | 0 | 71 |
| 0.1% $H_2O_2$, 0.001M $H_2SO_4$ | 50 ng $NO_2^{-1}$ + 50 ng $NO_3^{-1}$ | 41 | 40 |

TABLE 2-1-continued

Characteristics of $NO_x$ Impinger Solutions for IC Analysis

| Impinger Solution | Sample | Results as ng $NO_2$ | |
| --- | --- | --- | --- |
| | | Nitrite Ion | Nitrate Ion |
| Water | 50 ng $NO_2^{-1}$ + 50 ng $NO_3^{-1}$ | 41 | 40 |
| 0.001M KOH | 50 ng $NO_2^{-1}$ + 50 ng $NO_3^{-1}$ | 44 | 48 |
| Water | 50 ng $NO_2^{-1}$ | 38 | 0 |
| Water | 50 ng $NO_3^{-1}$ | 0 | 38 |
| Water | 5000 ng $NO_2$–1 | 4545 | 4 |
| Water | 5000 ng $NO_2^{-1}$ + 5000 ng $NO_3^{-1}$ | 4543 | 4648 |
| 0.1% $H_2O_2$, 0.001M $H_2SO_4$, | 5000 ng $NO_2^{-1}$ | 3 | 4416 |
| 0.1% $H_2O_2$, 0.001M $H_2SO_4$, | 5000 ng $NO_3^{-1}$ | 0 | 4455 |
| 0.1% $H_2O_2$, 0.001M $H_2SO_4$, | 5000 ng $NO_2^{-1}$ + 5000 ng $NO_3^{-1}$ | 0 | 7749 |
| 0.001M $H_2SO_4$ | 50 ng $NO_2^{-1}$ | 48 | 12 |
| 0.1% $H_2O_2$ | 50 ng $NO_2^{-1}$ | 50 | 30 |
| 0.1% $H_2O_2$, 0.001M $H_2SO_4$, | 50 ng $NO_2^{-1}$ | 0 | 51 |
| 0.001M $H_2SO_4$ | 50 ng $NO_3^{-1}$ | 0 | 53 |
| 0.1% $H_2O_2$ | 50 ng $NO_3^{-1}$ | 0 | 53 |
| 0.1% $H_2O_2$, 0.001M $H_2SO_4$, | 50 ng $NO_3^{-1}$ | 0 | 54 |
| 0.001M $H_2SO_4$ | 50 ng $NO_2^{-1}$ + 50 ng $NO_3^{-1}$ | 50 | 51 |
| 0.1% $H_2O_2$ | 50 ng $NO_2^{-1}$ + 50 ng $NO_3^{-1}$ | 0 | 95 |
| 0.1% $H_2O_2$, 0.001M $H_2SO_4$, | 50 ng $NO_2^{-1}$ + 50 ng $NO_3^{-1}$ | 0 | 99 |

The data given in table 2-1 can be summarized as follows:
a. Vapor samples collected in 0.001-M $H_2SO_4$ gave approximately equal concentrations of nitrite and nitrate ions.
b. Vapor samples collected in 0.001-M KOH with 0.1-percent hydrogen peroxide gave a larger response of nitrite ions.
c. Vapor samples collected in 0.001-M $H_2SO_4$ with 0.1-percent hydrogen peroxide gave only nitrate ions.
d. Blanks with 0.001-M $H_2SO_4$ or 0.3-percent hydrogen peroxide gave no response.
e. Nitrite ions are converted to nitrate ions in 0.001-M $H_2SO_4$ with 0.1-percent hydrogen peroxide.
f. Nitrite ions are not oxidized in 0.001-M KOH with 0.1-percent hydrogen peroxide.
g. Nitrite ions are oxidized in 0.001-M $H_2SO_4$ with 0.1-percent hydrogen peroxide.
h. Nitrite ions are oxidized by 0.1-percent hydrogen peroxide.
j. Nitrite ions arepartially oxidized by 0.001-M $H_2SO_4$.

A second series of tests were performed, which examined the conversion of the nitrite ion to the nitrate ion with hydrogen peroxide. Three samples of sodium nitrite standard at 1 mg/mL were prepared to examine the effect of pH and hydrogen peroxide on the IC analysis of nitrite and nitrate ions. The IC has a 0.1-mL sample loop and the calibration curves are based on the weight of nitrite or nitrate ion expressed as $NO_2$. Sample 1 was not changed, sample 2 was adjusted to pH 2 with sulfuric acid, and sample 3 had hydrogen peroxide added. The samples were injected into the IC. Sample 1 showed only nitrite ion. Sample 2 showed nitrite ion and nitrate ions and on repeated injection, the nitrite ions decreased and the nitrate ions increased. Sample 3 showed only nitrate ions. This test was repeated with actual samples collected from field tests and similar results were observed.

Based on the observations from the tests described above, the impinger solution selected for gas analysis of was a mixture of $10^{-3}$ molar sulfuric acid and 0.1-weight-percent hydrogen peroxide. Additional tests with this solution in the laboratory showed that all of the $NO_2$ is converted to nitrate ions, which eliminated the potential problem of interference in the nitrite analysis from the water dip.

FTIR ANALYSIS. The FTIR analytical method developed for the analysis of the scrubber liquor samples measured the nitrite ions, nitrate ions, and hydrogen peroxide concentrations at the same time. The general procedure described above was used for all scrubber liquor solutions. A liquid-attenuated, total-reflectance (ATR) cell was used to make the measurements of the scrubber liquor solutions. A zinc sulfide ATR crystal was used for the alkaline solutions and an AMTIR[a] ATR crystal was used for the acid solutions. The FTIR spectra are shown in FIG. 2-3.

HYDROGEN PEROXIDE ANALYSIS

Two methods were used to measure the concentration of hydrogen peroxide in the scrubber liquor. First, when nitrite ions were not present it was possible to titrate the hydrogen peroxide with potassium permanganate. Second, the hydrogen peroxide concentration could be measure directly with the FTIR. Both of these methods were used for the analysis of hydrogen peroxide.

TITRIMETRIC METHODS. The titration of hydrogen peroxide with potassium permanganate was examined in the presence of nitrate and nitrite ions to determine if residual hydrogen peroxide could be measured by this method. The general procedure for the analysis of hydrogen peroxide by titration with potassium permanganate was reviewed in 1.5.2.1. The effects of nitrite and nitrate ions are shown in table 2-3, where different solutions are titrated with standard potassium permanganate. In preparation for the titration, 0.5

TABLE 2-2

Calibration Data for the FTIR Analytical Method for Hydrogen Peroxide, Nitrite Ions and Nitrate Ions

| Sample | Wave No. cm$^{-1}$ | ABS | Wave No. cm$^{-1}$ | ABS | Wave No. cm$^{-1}$ | ABS |
|---|---|---|---|---|---|---|
| 0.5% $NO_2^{-1}$ | 1232 | 0.081899 | 1347 | 0.029234 | | |
| 1.0% $NO_2^{-1}$ | 1232 | 0.15518 | 1347 | 0.051323 | | |
| 2.0% $NO_2^{-1}$ | 1231 | 0.28171 | 1347 | 0.07456 | | |
| 4.0% $NO_2^{-1}$ | 1230 | 0.4839 | 1347 | 0.087775 | | |
| 10.0% $NO_2^{-1}$ | 1230 | 1.1215 | 1347 | -0.01407 | | |
| 0.5% $NO_3^{-1}$ | 1232 | 0.012018 | 1344 | 0.07715 | | |
| 1.0% $NO_3^{-1}$ | 1232 | 0.000541 | 1347 | 0.13503 | | |
| 2.0% $NO_3^{-1}$ | 1232 | 0.019144 | 1348 | 0.27953 | | |
| 4.0% $NO_3^{-1}$ | 1232 | 0.034383 | 1347 | 0.54054 | | |
| 10.0% $NO_3^{-1}$ | 1232 | 0.10588 | 1341 | 1.3168 | | |
| 0.5% $H_2O_2$ | 1232 | 0.011034 | 1347 | -0.005239 | 2830 | 0.022561 |
| 1.0% $H_2O_2$ | 1232 | 0.008928 | 1347 | 0.008558 | 2828 | 0.06587 |
| 2.0% $H_2O_2$ | 1232 | 0.006742 | 1347 | 0.028184 | 2833 | 0.13329 |
| 4.0% $H_2O_2$ | 1232 | 0.003655 | 1347 | 0.028184 | 2832 | 0.27652 |
| 10.0% $H_2O_2$ | 1232 | 0.021147 | 1347 | 0.08005 | 2833 | 0.53662 |

The data show regions where the absorption spectra overlap for each of the compounds. However, the hydrogen peroxide absorption at 2830 cm$^{-1}$ has little contribution from the nitrite or nitrate ions, and the nitrite ion absorption at 1232 cm$^{-1}$ has little contribution from the nitrate ion or hydrogen peroxide. The nitrate ion absorption at 1347 cm$^{-1}$ has some overlap with the nitrite ion and hydrogen peroxide has a second absorption peak in that region. Because there are regions where there is little interference for the nitrite ion and hydrogen peroxide, then their contribution to the nitrate ion absorption can be subtracted from the nitrate ion absorption at 1347 cm$^{-1}$. The program developed by Mattson and Schwindt is designed to adjust for these interferences and was used to develop calibration data for each species. The calibration data used for the analysis of hydrogen peroxide and the nitrite and nitrate ions is given in table 2-2.

Several different ranges were tired in an attempt to obtain the best fit for the calibration data. The best fits were obtained with the equations listed below:

$NO_3^{-1}$ y=0.0114x$^2$+0.8866x $NO_2^{-1}$ y=0.998m $H_2O_2$ y=0.0483x$^2$+0.0511x

These equations were used in the calculation of the concentrations of nitrite ions, nitrate ions, and hydrogen peroxide in the scrubber liquor samples.

mL of the sample was added to approximately 100 mL of water that contained 10 mL of 1:4 (vol/vol) sulfuric acid. 0.02-N Potassium permanganate was used in all of the titrations. The conversion of nitrite to nitrate in the presence of hydrogen peroxide is a fast reaction; therefore, a test for the presence of nitrite ion by IC could be used as an indicator as to the presence of hydrogen peroxide. That is, if nitrite ion is present, then hydrogen peroxide could not be present. Thus, a combination of ion chromatography and hydrogen peroxide titration with potassium permanganate could effectively monitor the concentrations of the scrubber liquors materials.

The data in table 2-3 show that the nitrite ion is oxidized by the hydrogen peroxide and that the residual hydrogen peroxide can be titrated with potassium permanganate. Also, there is no effect from the nitrate ion on the titration of hydrogen peroxide. Therefore, when there is excess hydrogen peroxide, which would oxidize any nitrite ions to nitrate ions, the residual hydrogen peroxide can be determined by potassium permanganate titration. These data confirm another important point about the process, that is, hydrogen peroxide will oxidize nitrite ions in acid solution to nitrate ions. Similar effects were observed in section 2.1.2, where the selection of the impinger solution was made based on the oxidation of the nitrite ions in 0.001-M sulfuric acid by 0.1-percent hydrogen peroxide.

TABLE 2-3

Effect of Nitrite and Nitrate Ions on the Titration of Hydrogen Peroxide With Potassium Permanganate

| Solution | Potassium Permanganate, 0.02N, mL |
|---|---|
| 10% Hydrogen peroxide | 67.7 |
| 10% Sodium nitrate in DI water | 0.05 |
| 10% Sodium nitrite in DI water | 29.5 |
| 10% Sodium nitrate in 10% hydrogen peroxide | 65.7 |
| 10% Sodium nitrite in 10% hydrogen peroxide | 30.5 |

FTIR METHODS. The procedure used to measure the concentration of hydrogen peroxide has been described above. The FFIR method provides the concentrations of hydrogen peroxide, nitrite ions, and nitrate ions directly.

SCRUBBER LIQUOR ANALYSIS

The analytical procedures given above for the analysis of nitrite ions, nitrate ions, and hydrogen peroxide were used to measure the concentrations of these materials in the scrubber liquors. Both methods FTIR and IC with hydrogen peroxide titrations were used to analyze the composition of the scrubber liquors. Additional tests which proved important in the single-pass experiments (tests where the scrubber liquor was not recirculated) were the pH measurements. These pH measurements could be made at the top and bottom of the scrubber column, which provided information about the changes that took place in the scrubber column.

Numerical references in the text refer to the following materials:

BIBLIOGRAPHY

1. Parrish, C. and R. Barile, "Hypergolic Oxidizer and Fuel Scrubber Emissions Report", KSC-DL-3332, Sep. 30, 1994.
2. "Osterreichische Stickstoffwerke," U.S. Pat. No. 3,034,853, 1962.
3. "Oxidative Tailgas Scrubbing Technique," Nitrogen 94, 471, (1975).
4. "Office National Undustriel de Lazote," U.S. Pat. No. 3,329,478.
5. "Potasse et Engrais Chimiques," U.S. Pat. No. 3,348,914.
6. "Pollution Control," Nitrogen 95, 44, (1975).
7. "Urea as a Pollution Control Agent," Nitrogen 95, 32, (1975).
8. "Improved Hypergolic Vapor Removal Systems," Final Report, Contract NAS 10-10106.
9. "Hypergolic Vapor Scrubber Phase H ($N_2O_4$) & Phase III (MMH) Modification and Test Project," KSC-E-3084, Dec., 1986.
10. "A Process for Reduction of $NO_x$ Content in Flue Gas," 2nd International Conference on Control of Gaseous Sulphur and Nitrogen Compound Emissions, Univ. Salford, April 1976.
11. "Hydrogen Peroxide," Kirk-Othmer Encyclopedia of Chemical Technology, 3rd Ed., 13, 1, 12–38, (1981).
12. "KSC Launch Site Shuttle Nitrogen Tetroxide $N_2O_4$ Prototype Scrubber Test Requirements Document," Final Report, Contract LSOC 704357, Dec., 1992.
13. "Wet Chemical Procedure for the Removal of Oxides from Flue and Waste Gases," WLB, Wasser, Luft Boden, 36(5), 72, 74–5, (1992), CA 117(22):218837j.
14. "Purifying Combustion Products Prior to Their Discharge to the Atmosphere," Ger. Patent DE 2148244, 1972, CA77(14):92472w.
15. "Boiler Flue Gas Treatment with Hydrogen Peroxide," Japan Patent JP 53135878, 1978, CA90(25):1911857a.
16. "Simultaneous Removal of Sulfur Dioxide and Nitrogen Oxides from Flue Gases in a Stepwise Reaction with Separate Oxidant Addition," Ger. Patent DE 3642468 Al 880609, 1988, CA109(12):98123j.
17. "Environmental Protection and Material Recovery in Flue Gas Cleaning with Hydrogen Peroxide," Chem. Ind., 115(1), 23–4, (1992), CA 116(26):261304z.
18. "Process for Removing Oxides of Nitrogen from Flue Gases," Ger. Patent WO 8900449, 1989, CA111(2):11958e.
19. "Removal of Sulfur Dioxide and Nitrogen Oxides from Flue Gases," Ger. Patent DE 3436699, 1986, CA104(26):229790w.
20. "Method for the Denitration of Waste Gases with Obtenion of $HNO_3$," US Patent 5,112,587, May 12, 1992.
21. "The Use of Hydrogen Peroxide for the Control of Air Pollution," Stud. Environ. Sci., 34, 275–92, (1988), CA110(18):159688s.
22. "Gas Scrubber Using an Alkali Solution Containing Hydrogen Peroxide," Japan Patent JP 48101378, CA80 (26):148789m.
23. "Absorbing Nitrogen Oxides from a Waste Gas with a Solution Containing Hydrogen Peroxide, Hydroxide, and Cupric or Ferrous Ions," Japan Patent JP 49008465, CA80(26): 148804n.
24. "Nitrogen Oxide Removal from Gases by Scrubbing," Japan Patent JP 52085979, CA88(10):65480t.
25. "Conversion of Nitrogen Oxides to Potassium Nitrate in Waste Gas Treatment," Japan Patent JP 50033981, CA10 (10):67485k.
26. "Nitrogen Oxide ($NO_x$) Removal in the Stainless Steel Pickling Industry with Hydrogen Peroxide," Chem. Oxid., Proc. Int. Symp., 1st, Meeting 1991, 78–88, CA117 (20):197436k.
27. "Experimental Evaluation of Nitrogen Oxide ($NO_x$) and Iodine Retention during the Scrubbing of Dissolver Offgas," US Nucl. Regul. Comm. [Rep.] NUREG/CP, NUREG/CP-0086-V2, 767-74, 1987, CA111(6):46741f.
28. "Control of Nitrogen Oxide ($NO_x$) in Steel Pickling," Environ. Prog., 3(1), 40–3, 1984, CA100(20):161283t.
29. "Military Specification: Propellants, Nitrogen Tetroxide," MIL-P-26539D, 28 Aug. 1989, and MWL-P-26539D Amendment 1, 12 Mar 1991.
30. "Nitrogen," Standard Methods of Chemical Analysis, 6th Ed., 772, (1975).
31. "Nitrogen Compounds, Inorganic," Kirk-Othmer Encyclopedia of Chemical Technology, 3rd Ed., 16, 481, (1981).
32. "Oxygen, Elementary Forms and Hydrogen Peroxide," W. A. Benjamin Pub., pp 90–91, 1965.
33. "Peroxides and Peroy Compounds, Inorganic," Kirk-Othmer Encyclopedia of Chemical Technology, 3rd Ed., 17, 1, 22–23, (1981).
34. Hydrogen Peroxide, Am. Chem. Soc. Monograph Series, Reinhold Pub. Corp. N.Y.
35. Hoftyzer, P., F. Kwanten in G. Nonhebel (ed.): Gas Purification Process for Air Pollution Control, Butterworths, London 1972.
36. Jolly, W., The Inorganic Chemistry of Nitrogen, W. A. Benjamin, Inc., New York, 1964, p80.
37. Weisweiler, W., K. Eidam, M. Thiemann, E. Scheibler, and K. Wilhelm, " Absorption of $NO_2/N_2O_4$ in Nitric Acid", Chem. Eng. Tech., Vol. 13 (2), 97–101, 1990.
38. Miller, D., "Mass Transfer in Nitric Acid Absorption", Am. Inst. Chem. Eng. J., Vol. 38 (8), 1351–58, 1987.

39. Wendel, M. and R. Pigford, "Kinetics of Nitrogen Tetroxide Absorption in Water", *Am. Inst. Chem. Eng. J.* Vol. 4 (3), 249–56, 1958.
40. Danckwerts, P., "Significance of Liquid-Film Coefficients in Gas Absorption", *Ind. Eng. Chem.*, Vol. 43 (6), 1460–67, 1951.
41. Peters, M. and J. Holman, "Vapor- and Liquid-Phase Reactions between Nitrogen Dioxide and Water", *Ind. Eng. Chem.*, Vol. 47 (12), 2536–39, (1955).
42. Chambers, F., and T. Sherwood, "Absorption of Nitrogen Dioxide by Aqueous Solutions", *Ind. Eng. Chem.*, Vol. 29, No. 12, 1415–22, 1937
43. Wiegand, K., E. Scheibler, and M. Thiemann, "Computation of Plate Columns for $NO_x$ Absorption by a New Stage-to-Stage", *Chem. Eng. Technol.*, Vol. 13, 289–97, 1990.
44. Sherwood, T. and R. Pigford, Absorption and Extractions, McGraw-Hill, New York, 1952.
45. "Plate Column", *Ind. Eng. Chem. Progress Des. Dev.*, Vol. 19, 426–31, 1980.
46. Lefers, J. and P. van den Berg, "Absorption of $NO_2/N_2O_4$ into Diluted and Concentrated Nitric Acid", *Chem. Eng. J.*, Vol. 23, 211–21, 1982.
47. McKeown, A. and F. Belles, "Nitric Acid-Nitrogen Dioxide-Water System", *Ind. Eng. Chem.*, Vol. 47 (12), 2540–43.
48. Nonhebel, G., Processes for Air Pollution Control., Butterworth & Co., The Chemical Rubber Co., Cleveland, 1972.
49. Andrew, S. and D. Hanson, "The Dynamics of Nitrous Gas Absorption", *Chem. Eng. Sci.*, Vol. 28, 105–13, (1961).
50. Hampel, C., Ed., Encyclopedia of Electrochemistry, Reinhold Pub. Corp., New York, 1964.
51. Linde, D. and H. Frederikse, Eds., "CRC Handbook of Chemistry and Physics" 75th Ed., CRC Press, Boca Raton, 1995.
52. Shooter, D., "Nitrogen Dioxide and its Determination in the Atmosphere," J. Chem. Ed., Vol. 70 (5), A133, 1993.
53. "Hypergol Oxidizer Vapor Scrubber Report, Phase IV & V, Test Results," KSCE-824-0014, EG&G Florida, April 1989.
54. Thiemann, M., E. Scheiber, and K. Wiegand, "Nitric Acid, Nitrous Acid, and Nitrogen Oxides," Encyclopedia of Chemical Technology, 3rd. ed., Vol. A17, 293, 1983.
55. Parrish, C., Private communication from previous oxidizer studies.
56. "Hypergolic Nitrogen Tetroxide Vapor Scrubber, Phase I Test Report," KSC-DD-777, November 1983.
57. "Final Report, Hypergolic Vapor Scrubber, Phase II ($N_2O_4$) & Phase III (MMH) Modification and Test Project," KSCE-3084, December 1986.
58. "Sulfite-Caustic Tail Gas Scrubber System Test Report and Recommendations," KSCE-824-0010, August 1988.
59. "Hypergolic Oxidizer Vapor Scrubber Report Phase IV & Phase V Test Results," KSCE-824-0014, April 1989.
60. Parrish, C., "Final Report, KSC Launch Site Shuttle Nitrogen Tetroxide $N_2O_4$ Prototype Scrubber Test Requirements Document," Contract 704357, LSOC, December 1992.
61. "A 1/10 Scale Pilot Plant for the Ecological Demilitarization of MK 24 and MK 45 Aircraft Parachute Flares," NWSC/CR/RDTR-3, US NAD Crane, Crane, Ind., Jul. 17, 1972.
62. "Ecological Demilitarization of MK 24 and MK 45 Aircraft Parachute Flares," NWSC/CR/RDTR-212, US NAD Crane, Crane, Ind., Jul. 27 1972.
63. "Ecological Demilitarization of MK 24 and MK 45 Aircraft Parachute Flares," NWSC/CR/RDTR-213, US NAD Crane, Crane, Ind., Jul. 27, 1972.
64. Westberg, K., "The Conversion of Waste Scrubbing Liquor into Fertilizer", Aerospace Rpt. No. TOR-95 (5662)-1, Space and Missile Systems Center, Air Force Material Command, Los Angeles Air Force Base, Calif. 90245, Feb. 1, 1995.
65. Sprengel, H., *Pogg. Annelen*, 121, 188 (1864)
66. Chamot, E. M. and D. S. Pratt, *J. Am. Chem. Soc.*, 31, 922 (1909)
67. Martens, H. H., L. a. Dee, J. T. Nakamura, and F. C. Jaye, *Environmental Sci. Tech.*, 7, 1152 (1973)
68. Robertson, D. J., R. H. Groth, and E. G. Glastris, *Environmental Sci. Tech.* 9, 979 (1975)
69. ASTM D 1608-77, "Standard Test Methods for Oxides of Nitrogen in Gaseous Combustion Products (Phenol-Disulfonic Acid Procedures)," American Society for Testing and Materials, ASTM Committee on Standards, 1916 Race Street, Philadelphia, Pa. 19103-1187.
70. Holler, A. C. and R. V. Huch, *Anal. Chem.* 21, (11), 1385 (1949)
71. Barnes, Analyst, 75, 388–91 (1950)
72. Deniges, G., *Bull. soc. chim. Belg.*, 9, (4), 644 (1911)
73. Fisher, F. L., E. R. Ibert, and H. F. Beckman, *Anal. Chem.*, 30, (12), 1972 (1958)
74. Griess, *Ber.*, 12, 426 (1879)
75. Rider, B. F. and M. G. Mellon, *Ind. Eng. Chem. Anal. Ed.*, 18, 96 (1946)
76. Ilosvay, M. L. *Bull. Soc. Chem.*, 49, 388 (1889)
77. Robinson, R. J. and T. G. Thompson, *J. Mar. Res.*, 7, 42 (1948)
78. Saltzman, B. E., *Anal. Chem.*, 26, (12), 1949 (1950)
79. "Determination of Nitrogen Dioxide Concentration by Impinger Method", TVDL SOP-4.4, Nov. 26, 1990
80. Bendschneider, K. and R. J. Robinson, *J. Mar. Res.*, 11, 87 (1952)
81. Nydahl, F., *Talanta*, 23, 349 (1976)
82. ASTM D 3867-85, "Standard Test Methods for Nitrite-Nitrate in Water," American Society for Testing and Materials, ASTM Committee on Standards, 1916 Race Street, Philadelphia, Pa. 19103-1187.
83. Johnson, K. S. and R. L. Petty, *Limnol. Oceanogr.*, 28, (6) 1260 (1983)
84. Greenberg, A. E., L. S. Clesceri, and A. D. Eaton, Eds, *Standard Methods for the Examination of Water and Wastewater*, 18th Ed. Am. Pub. Health Assoc., Washington, D.C., 4–93 (1992)
85. Greenberg, A. E., L. S. Clesceri, and A. D. Eaton, Eds, *Standard Methods for the Examination of Water and Wastewater*, 18th Ed. Am. Pub. Health Assoc., Washington, D.C., 4–87 (1992)
86. Ormaza-Gonzalez, F. I. and A. P. Villalba-Flor, *Wat. Res.*, 28, (10), 2223 (1994)
87. Greenberg, A. E., L. S. Clesceri, and A. D. Eaton, Eds, *Standard Methods for the Examination of Water and Wastewater*, 18th Ed. Am. Pub. Health Assoc., Washington, D.C., 4–78 (1992)
88. Swann, M. H. and M. L. Adams, *Anal. Chem.*, 28, 1630 (1956)
89. Coldwell, B. B. and S. R. McLean, *Can. J. Chem.*, 36, 652 (1958)
90. Greenberg, A. E., L. S. Clesceri, and A. D. Eaton, Eds, *Standard Methods for the Examination of Water and Wastewater*, 18th Ed. Am. Pub. Health Assoc., Washington, D.C., 4–1 (1992)
91. Kolthoff, I. M. and P. J. Elving, *Tretis on Analytical Chemistry*, Wiley-Interscience, NY, 1959

92. Miltary Specification Propellants, Nitrogen Tetroxide, ML-P-26539D, Amendment 1, March 12, 1991.
93. Matson, C., and C. Schwindt
94. Hanada, T., H. Hohara, and K. Yamanishi, "Novel Method for Quantitative Determination of Hydrogen Peroxide", Japan Patent, JP 61232000 A2 861016.
95. Santo, H., T. Hashizume, and T. Yakoyama, "Influence of Oxidized Fats on the Microdetermination of Residual Hydrogen Peroxide in Foods by 4-Aminoantipyrine Colorimetry and the Removal of such Fats", Wakayama Prefect. Inst. Public Health, Wakayama, 640, Japan.
96. Graf, E. and J. Penniston, "Method for Determination of Hydrogen Peroxide with its Application illustrated by Glucose Assay", *Clin. Chem.*, Vol. 26(5), 658–60, 1980.
97. Horst, F., *Chem-Ztg.*, Vol 45, 572, 1921.
98. Reichert, J., et al., *Ind. Eng. Chem., Anal. Ed.*, Vol. 11, 194–7, 1939.
99. Jia, S. and Z. Zhang, "Chemiluminescence Reaction in the Luminol-Hydrogen Peroxide-Cobalt(II) System-Determination of Trace Cobalt in Water, Blood, and Ores", *Huaxue Xuebao*, Vol. 42(12), 1257–61, 1984.
100. Allsopp, C., *Analyst*, Vol. 66, 371, 1941.
101. Allen, N., *Ind. Eng. Chem., Anal. Ed.*, Vol. 2, 55–6, 1930.
102. Chang, Z. and J. Lu, "Chemiluminescent Reaction of the Luminol-Hydrogen Peroxide System Catalyzed by Chromium(Iff)", *Huaxue Tongbao*, Vol.42(5), 25–30, 1984.
103. Miyazawa, T., S. Lertsiri, K. Fujimoto, and M. Oka, "Luminol Chemiluminescent Determination of Hydrogen Peroxide at Picomole Levels Using HPLC with a Cation-Exchange Resin Gel Column Chromatography", *J. Chromatogr.*, Vol. 667(1–2), 99–104, 1994.
104. O'Brien, E., K. Kiely, A. Katrina, and K. Tipton, "A discontinuous Luminometric Assay for Monoamine Oxidase", *Biochem. Pharmiacol.*, Vol. 46(7), 1301–6, (1993).
105. Blum, L., Chemiluminescent Flow Injection Analysis of Glucose in Drinks with a Bienzyme Fiber Optic Biosensor", *Enzyme Microb. Technol.*, Vol. 15(5), 407–11, (1993).
106. Aitken, R. and D. Buckingham, "Enhanced Detection of Reactive Oxygen Species Produced by Human Spermatozoa with 7-Methylaminonaphthalin-1,2-dicarboxylic Acid Hydrazide", *Int. J. Androl.*, Vol. 15(3), 211–9, (1992).
107. Huang, Y., S. Li, B. Dremel, U. Bilitewski, and R. Schmid, "On-line Determination of Glucose Concentration Throughout Animal Cell Cultures Based on Chemiluminescent Detection of Hydrogen Peroxide Coupled with Flow-Injection Analysis", *J. Biotechnol.* Vol. 18(1–2), 161–72, (1991).
108. Akimoto, K., et al., "Luminol Chemiluminescence Reaction Catalyzed by a Microbial Peroxidase", *Anal. Biochem.*, Vol. 189(2), 182–5, (1990).
109. Eremin, S., S. Vlasenko, A. Osipov, I. Eremina, and A. Egerov., "Determination of Hydrogen Peroxide Concentrations by Flow-Injection Analysis Based on the Enhanced Chemiluminescent Reaction Using Peroxidase", *Anal. Lett.*, Vol. 22(9), 2037–50, (1989).
110. Hansen, E., S. Winther, and M. Gundstrup, "Enzymic Assay of Oxalate in Urine by Flow Injection Analysis Using Immobilized Oxalate Oxidase and Chemiluminescence Detection", *Anal. Lett.*, Vol. 27(7), 1239–53, (1994).
111. Roemer, F., A. Veldkamp, and P. Van Galen, "Determination of Hydrogen Peroxide in Cloud and Rain Water", *Phys.-Chem. Behav. Atmos. Pollut.* 74–82, (1984); CA,102:225714.
112. Segawa, T., T. Kamidate, and H. Watanabe, "Role of 3-Morpholino-1-propanesulfonic Acid as Energy Transferred in Chemiluminescence Reaction of Fluoricein Catalyzed by Horseradish Peroxidase.
113. Thompson, R., "Peroxyoxalate Chemiluminescence in a Microemulsion in Determining the Approximate Oxidant Concentration of an Aqueous Sample", U.S. Pat. 253,635.
114. Segawa, T., A. Kakizaki, K. Asako, T. Kamidate, and H. Watanabe, "Fluorescein Chemiluminescent Assay of Glucose in Serum Using Glucose Oxidase and Horseradish Peroxidase", *Anal. Sci.*, Vol. 8(6), 785–8, (1992).
115. Nakashima, K., S. Kawaguchi, R. Givens, and S. Akiyama, "Photographic Detection of Hydrogen Peroxide and Glucose by Peroxyoxalate Chemiluminescence", *Anal. Sci.*, Vol. 6(6), 833–6, (1990).
116. Mann, B. and M. Grayeski, "Background Emission form the Peroxyoxalate Chemiluminescence Reaction in the Absence of Fluorophores", *Anal. Chem.*, Vol. 62(14), 1532–6, (1990).
117. Gooijer, C. and N. Velthorst, "Low-level Interferences in Peroxyoxalate Chemiluminescence", *Biomed. Chromatogr.*, Vol. 4(3), 92–5, (1990).
118. Stigbrand, M., E. Ponten, and K. Ingum, "1,1'-Oxalyldiimidazole as Chemiluminescence Reagent in the Determination of Low Hydrogen Peroxide Concentrations by Flow Injection Analysis", *Anal. Chem.* Vol. 66(10), 1766–70, (1994).
119. Aoyama, N., et al., "Coumarin Derivatives for Quantitative Determination of Peroxidation-Active Substances by Chemiluminescence Analysis", Patent, WO 9315219 Al 930203; CA, 119:177137.
120. Yamaguchi, M., "Pyridazinoquinoxalinones for Use a Chemiluminescent Agents for Determination of Hydrogen Peroxide and for Luminescent Labeling Reagents", U.S. Pat. No. 5,324,835.
121. Akhavan-Tafti, M., "Enzyme-Catalyzed Chemiluminescence from Hydroxyaryl Cyclic Diacylhydrazide Compounds", PCT. *Int. Appl.*, 38 pp., 1992.
122. Yoshimi, Y. and K. Sakai, "Development of a Sensitive Method for Continuous Determination of Hydrogen Peroxide Concentration by Electrochemiluminescence", Food Bioprod. Process, Vol. 71(C4), 279–84, 1993.

One of the significant advantages of the present invention is the fact that the process can be run continuously, with measuring and adjustments made in real time while the process is being performed. Computer monitoring with software can initiate flow changes of reagents in response to automatic measurements in response to the dictates of process software. Another significant advantage of the process is its use with oxidizing agent streams which comprise materials which are free of non-nitrogen containing materials so that the resultant fertilizer may be essentially pure solutions (greater than 99.9% by weight solute) of potassium nitrate. Treatment of flue gases has not been able to produce such a pure product at least because of variety of materials in the effluent. Additionally, the original material in the treatment stream need not be nitrogen oxides, as evidenced by the treatment of hydrazine materials, as the process and apparatus is able to convert the nitrogen containing materials into nitrogen oxides and especially into nitric oxide during the process.

Another method of implementing the invention includes introducing the hydrogen peroxide to the scrubber liquid as an acidic solution with a pH between about 2 to about 5. A hydroxide is introduced in order to keep the scrubber liquid at the desired pH range of 2 to 5 during the scrubbing process. After the scrubbing process takes place at the acidic pH, additional hydroxide will need to be added to have the scrubbed solution at a pH for fertilizer, for example a pH of 5 to 11. This additional hydroxide may be added to the scrubbing system or may be added to the scrubbed solution after the scrubbed solution is drawn from the scrubbing system.

The fact that this is a continuous system allows for the water, the vapor stream containing the at least one oxide of nitrogen, hydrogen peroxide, and hydroxide to be introduced at the same point. Other hydroxides such as sodium and ammonium hydroxide may be substituted for the potassium hydroxide, as well as a combination thereof.

What is claimed:

1. A process for converting vapor streams containing at least one oxide of nitrogen therein to a liquid fertilizer composition comprising the steps of:

contacting the vapor stream with water to form an oxy acid(s) of nitrogen mixture from the at least one oxide of nitrogen, exposing the oxy acid(s) of nitrogen mixture to hydrogen peroxide to convert at least some of any oxy acids of nitrogen other than in the nitrate form present to a nitrate ion, sampling the oxy acid(s) of nitrogen mixture with hydrogen peroxide to determine a relative amount of hydrogen peroxide;

adding hydrogen peroxide to the oxy acid(s) of nitrogen mixture when sampling determines there is less than a predetermined excess of hydrogen peroxide, and adding a hydroxide solution to the oxy acid(s) of nitrogen mixture to form a nitrate solution.

2. The process of claim 1, further comprising:

adding additional hydroxide to adjust pH to between 5 and 11 to form additional nitrate after the desired level of conversion of the at least one nitrogen oxide is met.

3. The process of claim 1, further comprising:

repeating steps a–g in a continuous process until the desired level of conversion of the at least one nitrogen oxide is met.

4. The process of claim 1, wherein the hydroxide is potassium hydroxide.

5. The process of claim 1, wherein the hydroxide is sodium hydroxide.

6. The process of claim 1, wherein the hydroxide is ammonium hydroxide.

7. The process of claim 1 further comprising:

sampling the hydroxide solution mixture adding hydroxide to maintain a pH from about 2 to 5 based upon a determination of pH made from the hydroxide solution mixture samples.

8. A process for converting vapor streams containing at least one oxide of nitrogen to a liquid fertilizer composition comprising the steps of:

a) directing a vapor stream containing the at least one oxide of nitrogen to a first contact zone, b) contacting said vapor stream with water to form oxy acid (s) of nitrogen from said at least one oxide of nitrogen, c) directing said acid(s) as a second stream to a second contact zone, d) exposing said second stream to hydrogen peroxide which is present within said second contact zone to convert at least some of any oxy acid (s) of nitrogen or ions other than in the nitrate form present within said second stream to nitrate ion, e) sampling said stream within said second contact zone to determine the relative amount of hydrogen peroxide within said second contact zone, f) adding hydrogen peroxide to said second contact zone when there is less than an excess of hydrogen peroxide in said second stream, g) adding a solution comprising potassium hydroxide to said second stream to maintain an acid pH in said second stream within said second contact zone to form a solution of potassium nitrate, h) adding additional potassium hydroxide to said second stream to adjust pH to between 5 and 11 within said second stream within said second contact zone to form additional potassium nitrate, and i) removing said solution of potassium nitrate from said second contact zone.

9. A process for converting vapor streams containing at least one oxide of nitrogen to a solution of nitrate comprising the steps of:

a) directing a vapor stream containing the at least one oxide of nitrogen to a first contact zone, b) contacting said vapor stream with water to form oxy acid (s) of nitrogen from said at least one oxide of nitrogen, c) directing said acid(s) as a second stream to a second contact zone, d) exposing said second stream to hydrogen peroxide which is present within said second contact zone to convert at least some of any oxy acid (s) of nitrogen or ions other than in the nitrate form present within said second stream to nitrate ion, e) sampling said stream within said second contact zone to determine the relative amount of hydrogen peroxide within said second contact zone, f) adding hydrogen peroxide to said second contact zone when there is less than an excess of hydrogen peroxide in said second stream, and g) adding a solution comprising a hydroxide to said second stream to maintain an acid pH in said second stream within said second contact zone to form a solution of a nitrate.

* * * * *